United States Patent
Spector et al.

(10) Patent No.: US 10,912,360 B2
(45) Date of Patent: *Feb. 9, 2021

(54) MAGNETIC POUCH ATTACHMENT MECHANISM WITH CRASH STABLE LOCKING TEETH

(71) Applicants: Ferno-Washington, Inc., Wilmington, OH (US); Shell Case Limited, Hong Kong (CN)

(72) Inventors: Yuval Spector, Kfar Monash (IL); Timothy Paul Schroeder, Mason, OH (US); Eyal Bar-Erez, Kfar Monash (IL)

(73) Assignees: Ferno-Washington, Inc., Wilmington, OH (US); Shell Case Limited, Hong Kong (CN)

( * ) Notice: Subject to any disclaimer, the term of this patent is extended or adjusted under 35 U.S.C. 154(b) by 118 days.

This patent is subject to a terminal disclaimer.

(21) Appl. No.: 15/326,847

(22) PCT Filed: Aug. 8, 2014

(86) PCT No.: PCT/US2014/050306
§ 371 (c)(1),
(2) Date: Jan. 17, 2017

(87) PCT Pub. No.: WO2016/010567
PCT Pub. Date: Jan. 21, 2016

(65) Prior Publication Data
US 2017/0197558 A1 Jul. 13, 2017

Related U.S. Application Data

(60) Provisional application No. 62/026,520, filed on Jul. 18, 2014.

(51) Int. Cl.
*B60R 11/06* (2006.01)
*A45C 13/10* (2006.01)
(Continued)

(52) U.S. Cl.
CPC .......... *A45C 13/1069* (2013.01); *B60R 11/06* (2013.01); *F16B 1/00* (2013.01);
(Continued)

(58) Field of Classification Search
CPC ............ A45C 13/1069; A45C 2200/10; A61G 12/005; B60R 2011/0003;
(Continued)

(56) References Cited

U.S. PATENT DOCUMENTS

| 269,985 A | 1/1883 | Joseph |
| 619,174 A | 2/1899 | Harry, II |

(Continued)

FOREIGN PATENT DOCUMENTS

| CH | 432266 A | 3/1967 |
| DE | 2000967 B | 7/1971 |

(Continued)

OTHER PUBLICATIONS

Non-Final Office Action dated Jun. 7, 2017, pertaining to U.S. Appl. No. 15/435,373, filed Feb. 17, 2017.
(Continued)

*Primary Examiner* — Jes F Pascua
*Assistant Examiner* — Nina K Attel
(74) *Attorney, Agent, or Firm* — Dinsmore & Shohl, LLP

(57) ABSTRACT

A magnetic pouch attachment mechanism includes one or more magnetic pouch mounts (500) having an alignment plate (505) with one or more magnetic areas (520) disposed within the alignment plate (505). The magnetic pouch mount (500) also includes a pouch (900) removably coupled with the one or more magnetic pouch mounts (500) such that when the pouch (900) is placed in proximity to the one or more magnetic pouch mounts (500), an attractive magnetic force is exerted between the pouch (900) and the one or more magnetic pouch mounts (500) such that the pouch (Continued)

(900) aligns with and couples to the one or more magnetic pouch mounts (500). A mounting bracket (920) coupled to the pouch (900) includes one or more bracket magnetic areas (935) disposed within the mounting bracket (920) and configured to induce an attractive magnetic force with the one or more magnetic areas (520).

16 Claims, 28 Drawing Sheets

(51) Int. Cl.
    *F16B 1/00*         (2006.01)
    *H01F 7/02*         (2006.01)
    *A45C 13/00*       (2006.01)
    *B60R 11/00*       (2006.01)
    *B60R 7/08*         (2006.01)
    *B60P 7/08*         (2006.01)

(52) U.S. Cl.
    CPC .......... *H01F 7/0205* (2013.01); *A45C 13/005* (2013.01); *B60P 7/0815* (2013.01); *B60R 7/08* (2013.01); *B60R 2011/0019* (2013.01); *B60R 2011/0057* (2013.01); *F16B 2001/0035* (2013.01)

(58) Field of Classification Search
    CPC ..... B60R 2011/0019; B60R 2011/0059; B60R 2011/0057; B60R 2011/0078; B60R 11/06; B60R 7/08
    USPC ........ 224/581–585, 271, 255, 256, 545–548, 224/555, 562, 400, 431, 442, 462, 275, 224/276, 482, 483; 220/476, 480, 481, 220/483, 751; 248/477, 478, 496, 206.5, 248/213.2, 220.41, 22.42, 221.11, 221.12, 248/222.11, 222.12, 222.13, 223.31, 248/223.41, 225.51, 225.61, 682, 201, 248/220.21
    See application file for complete search history.

(56) References Cited

U.S. PATENT DOCUMENTS

| | | |
|---|---|---|
| 716,852 A | 12/1902 | Baker et al. |
| 1,178,360 A | 4/1916 | Tudor et al. |
| 1,263,918 A | 4/1918 | Miller et al. |
| 1,288,010 A | 12/1918 | Isaac et al. |
| 1,576,034 A | 3/1926 | Butt et al. |
| 1,702,937 A | 2/1929 | Friedemann et al. |
| 1,817,962 A | 8/1931 | Breuer et al. |
| 2,391,051 A | 12/1945 | Windsor et al. |
| 2,456,024 A | 12/1948 | Schofield et al. |
| 2,473,364 A | 6/1949 | Dickinson et al. |
| 2,480,322 A | 8/1949 | Cozzoli et al. |
| 2,556,076 A | 6/1951 | Evans et al. |
| 2,644,591 A | 7/1953 | McMahan et al. |
| 2,685,912 A | 8/1954 | Evans et al. |
| 2,688,504 A | 9/1954 | Parker et al. |
| 3,042,221 A | 7/1962 | Rasmussen et al. |
| 3,116,773 A | 1/1964 | Leonhard |
| 3,204,998 A | 9/1965 | Stollenwerk et al. |
| 3,358,300 A | 12/1967 | Smith et al. |
| 3,375,936 A | 4/1968 | Kessler et al. |
| 3,392,848 A | 7/1968 | McConnell et al. |
| 3,451,580 A | 6/1969 | Husby |
| 3,591,121 A | 7/1971 | Parris |
| 3,605,637 A | 9/1971 | Prete, Jr. |
| 3,606,619 A | 9/1971 | Stollenwerk et al. |
| 3,613,900 A | 10/1971 | Chiu |
| 3,718,886 A | 2/1973 | Hoffmeister |
| 3,770,234 A | 11/1973 | Fovall et al. |
| 3,840,265 A | 10/1974 | Stirling et al. |
| 3,846,944 A | 11/1974 | Lambert |
| 3,973,818 A | 8/1976 | Soquenne |
| 4,114,947 A | 9/1978 | Nelson |
| 4,170,335 A | 10/1979 | King |
| 4,173,382 A | 11/1979 | Booty |
| 4,178,032 A | 12/1979 | Hone et al. |
| 4,210,355 A | 7/1980 | Legueu et al. |
| 4,230,432 A | 10/1980 | Howell |
| 4,256,424 A | 3/1981 | Knox et al. |
| 4,263,951 A | 4/1981 | Siegel |
| 4,386,642 A | 6/1983 | Durbin |
| 4,397,432 A | 8/1983 | Resetar et al. |
| 4,423,817 A | 1/1984 | Monjo-Rufi et al. |
| 4,425,978 A | 1/1984 | Star |
| 4,458,864 A | 7/1984 | Colombo et al. |
| 4,513,866 A | 4/1985 | Thomas |
| 4,568,050 A | 2/1986 | Radoy et al. |
| 4,576,319 A | 3/1986 | Brown |
| 4,602,756 A | 7/1986 | Chatfield et al. |
| 4,677,794 A | 7/1987 | Parron et al. |
| 4,763,360 A | 8/1988 | Daniels et al. |
| 4,783,034 A | 11/1988 | Ostrander et al. |
| 4,853,555 A | 8/1989 | Wheat et al. |
| 4,915,435 A | 4/1990 | Levine |
| 4,974,377 A | 12/1990 | Dominitz et al. |
| 5,007,608 A | 4/1991 | Carroll, Jr. et al. |
| 5,096,030 A | 3/1992 | Espinosa et al. |
| 5,157,409 A | 10/1992 | Hamin |
| 5,207,303 A | 5/1993 | Oswalt et al. |
| 5,383,629 A | 1/1995 | Morgan et al. |
| 5,425,520 A | 6/1995 | Masumoto |
| 5,490,703 A | 2/1996 | Hewko et al. |
| 5,604,958 A | 2/1997 | Anscher |
| 5,615,848 A | 4/1997 | Ceriani et al. |
| 5,729,869 A | 3/1998 | Anscher |
| 5,732,867 A * | 3/1998 | Perkins ..................... A45F 3/08 224/271 |
| 5,732,965 A | 3/1998 | Willey |
| 5,738,306 A | 4/1998 | Moss et al. |
| 5,755,478 A | 5/1998 | Kamiya et al. |
| 5,779,296 A | 7/1998 | Hewko et al. |
| 5,785,277 A | 7/1998 | Manning et al. |
| 5,815,629 A | 9/1998 | Finzel et al. |
| 5,833,095 A | 11/1998 | Russell et al. |
| 5,845,780 A | 12/1998 | Allen |
| 5,850,891 A | 12/1998 | Olms et al. |
| 5,865,314 A | 2/1999 | Jacober |
| 5,886,674 A | 3/1999 | Yoshimi |
| 5,988,409 A | 11/1999 | Gusdorf et al. |
| 6,000,509 A | 12/1999 | Chisholm |
| 6,157,350 A | 12/2000 | House et al. |
| 6,241,109 B1 | 6/2001 | Kautz et al. |
| 6,244,400 B1 | 6/2001 | Bowers |
| 6,273,366 B1 | 8/2001 | Sprenger et al. |
| 6,296,094 B1 | 10/2001 | Knecht |
| 6,367,603 B1 | 4/2002 | Tiramani et al. |
| 6,585,188 B2 | 7/2003 | Alli |
| 6,595,379 B1 | 7/2003 | Powell |
| 6,618,018 B1 | 9/2003 | Sylvester et al. |
| 6,726,075 B1 | 4/2004 | Patel et al. |
| 6,746,138 B1 | 6/2004 | Neeld et al. |
| 6,762,727 B2 | 7/2004 | Rochford et al. |
| 6,789,714 B1 | 9/2004 | Benson et al. |
| 6,945,414 B1 | 9/2005 | Stevens et al. |
| 7,000,810 B1 | 2/2006 | Farmer |
| 7,048,242 B2 | 5/2006 | Oddsen |
| 7,097,204 B2 | 8/2006 | Jessup et al. |
| 7,200,871 B1 | 4/2007 | Carlson |
| 7,234,619 B2 | 6/2007 | Hicks et al. |
| 7,328,926 B1 | 2/2008 | Myers et al. |
| 7,502,226 B2 | 3/2009 | Searby et al. |
| 7,507,005 B1 | 3/2009 | Mier-Langner |
| 7,600,619 B2 | 10/2009 | Sapyta |
| 7,654,834 B1 | 2/2010 | Mier-Langner et al. |
| 7,669,945 B2 | 3/2010 | Blersch et al. |
| 7,677,400 B2 | 3/2010 | Bayazit et al. |
| 7,798,323 B1 | 9/2010 | McCann et al. |
| 7,946,771 B2 | 5/2011 | Boneschanscher et al. |
| 7,984,889 B2 | 7/2011 | Whitley et al. |

(56) References Cited

U.S. PATENT DOCUMENTS

| | | |
|---|---|---|
| 8,011,484 B2 | 9/2011 | McIntyre |
| 8,167,131 B1 | 5/2012 | Anderson |
| 8,172,077 B1 | 5/2012 | Gray |
| 8,276,795 B1 | 10/2012 | Dean et al. |
| 8,387,783 B2 | 3/2013 | Zack et al. |
| 8,505,794 B2 | 8/2013 | Ardigo |
| 8,636,154 B2 | 1/2014 | Chinn |
| 8,661,583 B2 | 3/2014 | Chinn et al. |
| 8,701,952 B1 | 4/2014 | Tripp |
| 8,807,376 B1* | 8/2014 | Mastors ............ A61M 5/1418 220/481 |
| 8,864,004 B2 | 10/2014 | Crawford et al. |
| 8,992,238 B2 | 3/2015 | Chinn |
| 9,072,653 B2 | 7/2015 | Nemard |
| 9,078,501 B2 | 7/2015 | Johnson |
| 9,282,794 B2 | 3/2016 | Farrelly |
| 9,379,504 B2 | 6/2016 | Chinn |
| 9,428,234 B2 | 8/2016 | Bopanna et al. |
| 9,611,975 B2 | 4/2017 | Chinn et al. |
| 9,820,556 B2 | 11/2017 | Adams et al. |
| 9,861,178 B1 | 1/2018 | Vanman et al. |
| 9,944,217 B2 | 4/2018 | Schroeder et al. |
| 10,307,313 B2 | 6/2019 | Schroeder et al. |
| 10,398,207 B2 | 9/2019 | Schroeder et al. |
| 10,413,046 B2 | 9/2019 | Hanchett et al. |
| 10,544,895 B2 | 1/2020 | Chinn et al. |
| 2003/0143052 A1 | 7/2003 | Fehrle et al. |
| 2004/0178309 A1 | 9/2004 | Crowley et al. |
| 2004/0253856 A1 | 12/2004 | Hoffmann |
| 2005/0039644 A1 | 2/2005 | Sheahan et al. |
| 2005/0098510 A1 | 5/2005 | Lom et al. |
| 2005/0232519 A1 | 10/2005 | Grimes |
| 2006/0243766 A1 | 11/2006 | Lan |
| 2006/0255221 A1 | 11/2006 | Tseng |
| 2006/0283906 A1 | 12/2006 | Laughton |
| 2007/0056921 A1 | 3/2007 | Lo |
| 2007/0097617 A1 | 5/2007 | Searby et al. |
| 2008/0023976 A1 | 2/2008 | Myers et al. |
| 2008/0121730 A1 | 5/2008 | Calkin |
| 2008/0169739 A1 | 7/2008 | Goldenberg |
| 2008/0302553 A1 | 12/2008 | Ross et al. |
| 2009/0014584 A1 | 1/2009 | Rudduck et al. |
| 2009/0014602 A1 | 1/2009 | Frost |
| 2009/0140112 A1 | 6/2009 | Carnevali |
| 2009/0165208 A1 | 7/2009 | Reed et al. |
| 2010/0307649 A1 | 12/2010 | Santos Dominguez |
| 2011/0147428 A1 | 6/2011 | Crawford et al. |
| 2012/0006873 A1 | 1/2012 | Chinn |
| 2012/0126075 A1 | 5/2012 | Chinn et al. |
| 2013/0081233 A1 | 4/2013 | Lu |
| 2013/0193179 A1 | 8/2013 | Davidson |
| 2014/0016503 A1 | 1/2014 | Altekar et al. |
| 2014/0226315 A1 | 8/2014 | Nicieja et al. |
| 2014/0227892 A1 | 8/2014 | Chinn |
| 2014/0263502 A1* | 9/2014 | Byham ................ B60R 7/043 224/275 |
| 2014/0374564 A1 | 12/2014 | Schroeder et al. |
| 2015/0233669 A1 | 8/2015 | Ponder |
| 2015/0344089 A1* | 12/2015 | Bopanna ............ B62J 9/00 224/430 |
| 2016/0031382 A1 | 2/2016 | Chinn et al. |
| 2017/0020249 A1 | 1/2017 | Schroeder et al. |
| 2017/0021775 A1 | 1/2017 | Spector et al. |
| 2017/0158145 A1 | 6/2017 | Chinn et al. |
| 2017/0197558 A1 | 7/2017 | Spector et al. |
| 2017/0202330 A1 | 7/2017 | Schroeder et al. |
| 2017/0209318 A1 | 7/2017 | Schroeder et al. |
| 2018/0073676 A1 | 3/2018 | Schroeder et al. |
| 2020/0039056 A1 | 2/2020 | Damberg |

FOREIGN PATENT DOCUMENTS

| | | |
|---|---|---|
| DE | 3209091 A1 | 9/1983 |
| DE | 3209092 A1 | 9/1983 |
| DE | 3230905 A1 | 2/1984 |
| DE | 68910460 U1 | 12/1989 |
| DE | 19716046 A1 | 10/1998 |
| DE | 202006020143 U1 | 1/2008 |
| DE | 102009039471 A1 | 3/2011 |
| DE | 102010024544 A1 | 12/2011 |
| EP | 0021526 A2 | 1/1981 |
| EP | 105675 A2 | 4/1984 |
| EP | 260726 A2 | 3/1988 |
| EP | 0583491 A1 | 2/1994 |
| EP | 583492 A1 | 2/1994 |
| EP | 972616 A2 | 1/2000 |
| EP | 1790521 A1 | 5/2007 |
| EP | 1863119 A1 | 12/2007 |
| EP | 2206623 A1 | 7/2010 |
| EP | 2451418 B1 | 5/2013 |
| EP | 2614804 A1 | 7/2013 |
| EP | 2614805 A1 | 7/2013 |
| FR | 1085340 A | 1/1955 |
| FR | 2481110 A1 | 10/1981 |
| FR | 2647323 A1 | 11/1990 |
| FR | 2649007 A1 | 1/1991 |
| GB | 1530794 A | 11/1978 |
| GB | 2401541 A | 11/2004 |
| GB | 2452083 A | 2/2009 |
| WO | 9115178 A1 | 10/1991 |
| WO | 9927881 A1 | 6/1999 |
| WO | 0059446 A1 | 10/2000 |
| WO | 2001087665 A1 | 11/2001 |
| WO | 2006122351 A1 | 11/2006 |
| WO | 2011006163 A2 | 1/2011 |

OTHER PUBLICATIONS

Extended European Search Report from EP Application No. 13163002.2 dated Jun. 11, 2013.

Extended European Search Report from EP Application No. 13163007.1 dated Jun. 11, 2013.

International Search Report and Written Opinion dated Nov. 3, 2011, pertaining to International Application No. PCT/US2010/041724.

International Search Report and Written Opinion dated Jun. 27, 2014, pertaining to International Application No. PCT/US2014/015898.

Office Action dated Jul. 29, 2014, pertaining to Russian Application No. 2012101216.

International Preliminary Report on Patentability, pertaining to International Application No. PCT/US2010/041724 dated Jan. 19, 2012.

Examination Report, pertaining to Australian Application No. 2010271194 dated Nov. 27, 2013.

Office Action pertaining to Chinese Application No. 201080038769.2 dated Jan. 24, 2014.

International Search Report and Written Opinion dated Apr. 16, 2013, pertaining to International Application No. PCT/US2013/026129 dated Apr. 16, 2013.

International Preliminary Report on Patentability, pertaining to International Application No. PCT/US2013/026129 dated Aug. 28, 2014.

Examination Report, pertaining to Australian Application No. 2013203990 dated Aug. 18, 2014.

International Search Report and Written Opinion, pertaining to PCT/2014/012492 dated Apr. 3, 2014.

Preliminary Rejection, pertaining to Korean Application No. 10-2012-7003477 dated Jul. 27, 2015.

Examination Report, pertaining to Canadian Application No. 2767547 dated Jul. 7, 2015.

Examination Report, pertaining to EP Patent Application No. 13163007.1 dated Nov. 17, 2014.

Examination Report, pertaining to Australian Patent Application No. 2014203593 dated Feb. 20, 2015.

Examination Report, pertaining to Australian Patent Application No. 2014203595 dated Jul. 23, 2015.

(56) References Cited

OTHER PUBLICATIONS

International Preliminary Report on Patentability, pertaining to International Application No. PCT/US2014/012492 dated Aug. 20, 2015.
International Search Report and Written Opinion dated Mar. 3, 2015, pertaining to International Application No. PCT/US2014/050288.
International Search Report and Written Opinion dated Mar. 3, 2015, pertaining to International Application No. PCT/US2014/050306.
International Search Report and Written Opinion dated Sep. 29, 2015, pertaining to International Application No. PCT/US2014/050392.
Examination Report dated Feb. 5, 2016, pertaining to European Patent Application No. 14703501.8.
Examination Report dated Mar. 1, 2016, pertaining to EP Patent Application No. 14/707550.1.
Official Action dated Feb. 29, 2016, pertaining to Egyptian Patent Application No. PCT/NA/50/2012.
Office Action dated Dec. 22, 2015, pertaining to Chinese Patent Application No. 201410247226.1.
Office Action dated Dec. 16, 2015, pertaining to Japanese Patent Application No. 2015-020347.
Notice of Allowance dated Jan. 20, 2016, pertaining to U.S. Appl. No. 14/633,797.
International Search Report dated Aug. 8, 2006 pertaining to Australian Patent Application No. PCT/AU2006/000645.
Office Action dated May 18, 2018 Pertaining to U.S. Appl. No. 15/283,981, 11 pages.
Office Action dated May 18, 2018 Pertaining to U.S. Appl. No. 15/326,805, 10 pages.
Search Report and Written Opinion dated Jul. 3, 2018 pertaining to Singapore Patent App. No. 10201708458T, 9 Pages.
Search Report dated Jan. 22, 2018, pertaining to Singapore Patent Application No. 10201708460R, 2 pages.
Written Opinion dated Jan. 22, 2018, pertaining to Singapore Patent Application No. 10201708460R, 7 pages.
Extended European Search Report pertaining to European Patent Application No. 18189787.7 dated Oct. 22, 2018.
Final Office Action dated Jul. 29, 2019, pertaining to U.S. Appl. No. 15/283,975.
Office Action pertaining to U.S. Appl. No. 16/522,728, dated Mar. 2, 2020.

* cited by examiner

MAGNETIC POUCH ATTACHMENT MECHANISM WITH CRASH STABLE LOCKING TEETH

CROSS-REFERENCE TO RELATED APPLICATIONS

This application claims the benefit of Provisional Application No. 62/026,520, filed Jul. 18, 2014, and titled "A Crash-Ready, Portable, Compartmentalization Device." This application is related to: Provisional Application 61/763,045, filed Feb. 11, 2014, and titled "Equipment Mounting System" and PCT Application NO. US 2014/015, 898, filed Feb. 11, 2014, and titled "Equipment Mounting System," and US applications, filed Aug. 8, 2014, and titled "Equipment Mounting System." This application is also related to PCT application, filed Aug. 8, 2014, and titled "Equipment Mounting System" which is herein incorporated by reference in its entirety.

TECHNICAL FIELD

The present specification generally relates to a portable compartmentalization device for use in various configurations with a vehicle or a structure and, more specifically, a crash-ready, portable, compartmentalization device that is used with an equipment mounting system.

BACKGROUND

Many supplies used in mobile applications are organized in furniture using design techniques for use in a structure. Many times, the design techniques do not overcome the deficiencies of using the furniture in a space limited environment, such as in mobile applications. Furthermore, the furniture is normally rigidly attached in mobile applications which may not allow the supplies stored in the furniture to be used in another location. The rigors that the securing fasteners of the furniture must endure are increased in mobile applications over static applications. Furthermore, the occupants of the vehicle may require relocation of the furniture without the need for tools.

SUMMARY

In one embodiment a magnetic pouch attachment mechanism may include one or more magnetic pouch mounts and one or more pouches. Each magnetic pouch mount may include an alignment plate, one or more magnetic areas disposed within the alignment plate, one or more mounting apertures disposed in the alignment plate, one or more latch apertures disposed in the alignment plate, and a latch with a latch handle and one or more latch teeth, each latch tooth protrudes into each latch aperture when the latch is in a retention position and each latch tooth is retracted out of each latch aperture when the latch is in a release position. The latch handle transitions the latch between the retention position and the release position. The one or more pouches may be removably coupled with the one or more magnetic pouch mounts such that when each pouch is placed in proximity to the one or more magnetic pouch mounts, an attractive magnetic force is exerted between the pouch and the one or more magnetic pouch mounts such that the pouch aligns with and couples to the one or more magnetic pouch mounts. Each pouch includes a container defining an interior compartment and having an opening for receiving items into the interior compartment, a flap hingedly coupled to the container and sized to cover the opening and at least a portion of an outer surface of the container, means for securing the flap to the outer surface of the container, and a mounting bracket coupled to the container. The mounting bracket may include one or more bracket magnetic areas disposed within the mounting bracket and configured to induce an attractive magnetic force with the one or more magnetic areas, one or more alignment pegs configured to removably couple with the one or more mounting apertures of the magnetic pouch mount, and one or more catches configured to removably couple with the one or more latch apertures of the magnetic pouch mount.

In another embodiment, a method of utilizing a pouch assembly may include moving a pouch into proximity of one or more magnetic pouch mounts. The pouch may include a container defining an interior compartment and having an opening for receiving items into the interior compartment, a flap hingedly coupled to the container and sized to cover the opening and at least a portion of an outer surface of the container, means for securing the flap to the outer surface of the container, and a mounting bracket coupled to the container. The mounting bracket may include one or more bracket magnetic areas disposed within the mounting bracket and configured to induce an attractive magnetic force with the one or more magnetic areas, one or more alignment pegs configured to removably couple with the one or more mounting apertures of the magnetic pouch mount, and one or more catches configured to removably couple with the one or more latch apertures of the magnetic pouch mount. The one or more magnetic pouch mounts may include an alignment plate, one or more magnetic areas disposed within the alignment plate, one or more mounting apertures disposed in the alignment plate, one or more latch apertures disposed in the alignment plate, and a latch comprising a latch handle and one or more latch teeth, each latch tooth protrudes into each latch aperture when the latch is in a retention position and each latch tooth is retracted out of each latch aperture when the latch is in a release position, and the latch handle transitions the latch between the retention position and the release position. The method may also include allowing an attractive magnetic force between the pouch and the one or more magnetic pouch mounts to draw and removably couple the pouch to the one or more magnetic pouch mounts.

In yet another embodiment, a pouch retrofit kit may include one or more magnetic pouch mounts which may include an alignment plate coupled to a surface, one or more magnetic areas disposed within the alignment plate, one or more mounting apertures disposed in the alignment plate, one or more latch apertures disposed in the alignment plate, and a latch comprising a latch handle and one or more latch teeth, each latch tooth protrudes into each latch aperture when the latch is in a retention position and each latch tooth is retracted out of each latch aperture when the latch is in a release position, and the latch handle transitions the latch between the retention position and the release position. The retrofit kit may also include a mounting bracket coupled to a pre-existing pouch, the mounting bracket may include one or more bracket magnetic areas disposed within the mounting bracket and configured to induce an attractive magnetic force with the one or more magnetic areas, one or more alignment pegs configured to removably couple with the one or more mounting apertures of the magnetic pouch mount, and one or more catches configured to removably couple with the one or more latch apertures of the magnetic pouch mount. When the mounting bracket is placed in proximity to the one or more magnetic pouch mounts, an attractive magnetic force is exerted between the mounting bracket and the one or more magnetic pouch mounts such that the mounting bracket aligns with and couples to the one or more magnetic pouch mounts.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 26:
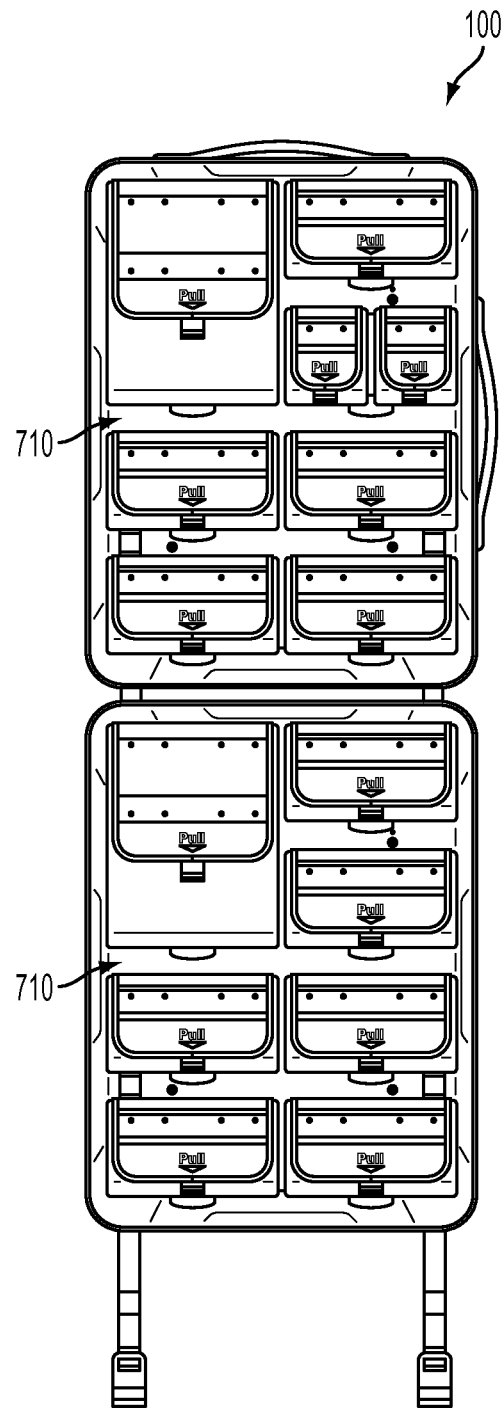
FIG. 26 is a front view of a first embodiment of the softwall according to one or more embodiments shown and described herein.
Figure 27:
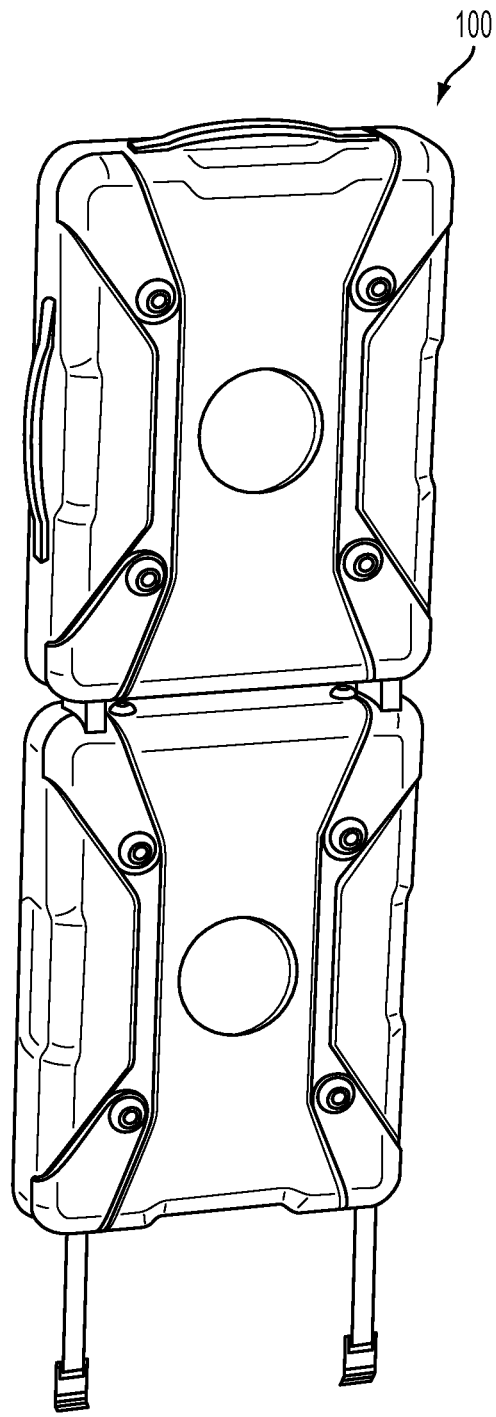
FIG. 27 is a rear view of the first embodiment of the softwall according to one or more embodiments shown and described herein.

FIGS. 26 and 27 generally depict one embodiment of a crash-ready, portable, modular, compartmentalization softwall device and system for organizing and securing items for transport. The softwall device generally includes two half shells forming a complete shell, each half shell has a backing plate with a number of removable means to secure a plurality of pouches to each half shell. The plurality of pouches may be configured to be secured to each half shell in a variety of configurations. For example, each removable means may secure only one pouch. In another example, a large pouch may be secured to two or more removable means. In yet another example, two small pouches may be secured to a single removable means. The configuration of the removable means in each half shell may allow for multiple configurations of various size pouches within the softwall device. Each half shell may be secured to the other half shell to form the complete shell and protect the pouches and the items held within. The shell, pouches, and the various removable means and connectors are all crash-ready as defined below. In other words, the complete shell, pouches, and various means to secure a plurality of pouches, and connectors are designed to survive and withstand inertial and impact forces normally occurring during a crash and still retain functionality and contain the various items stored within. Various embodiments of the softwall device and methods of its use will be described in more detail herein.

Figure 1:
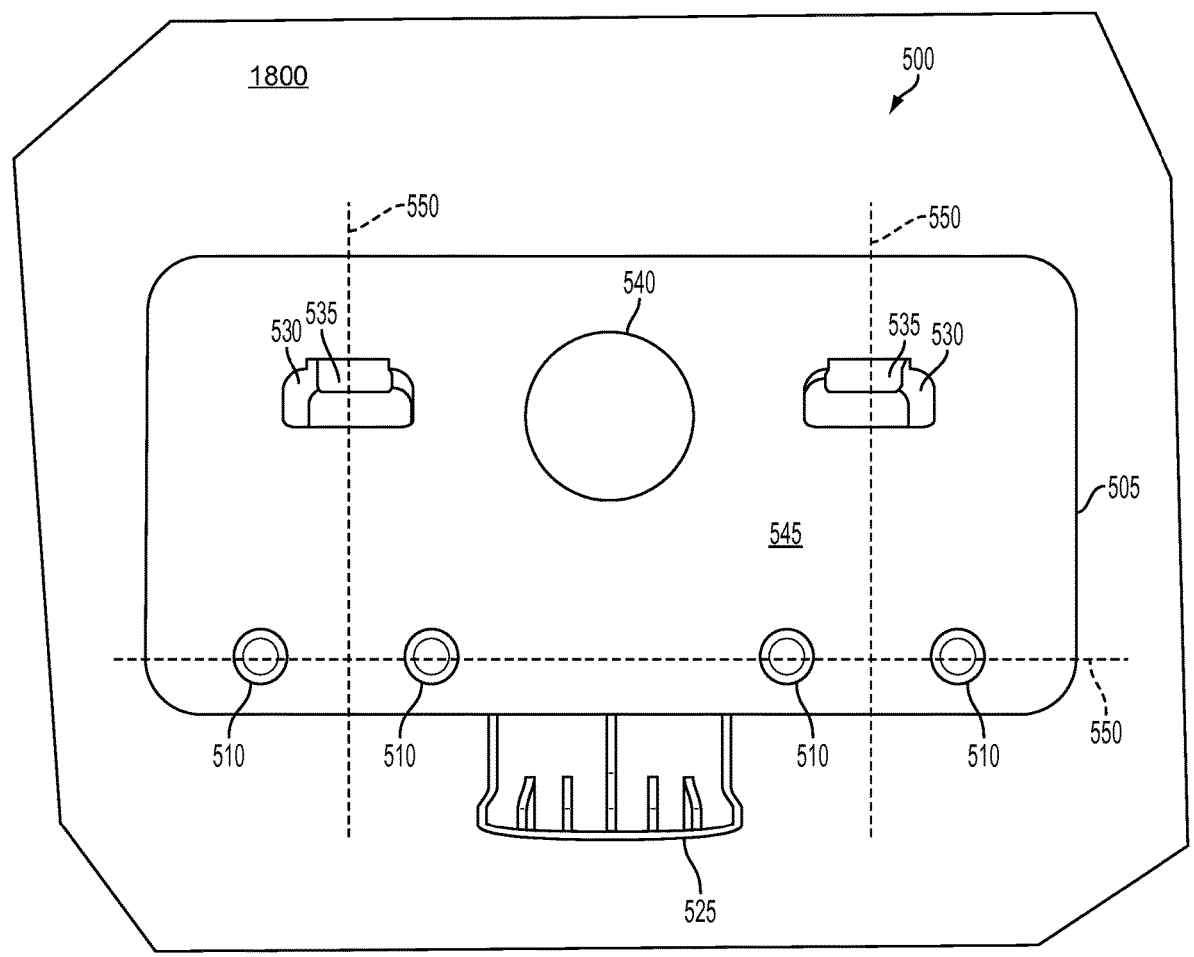
FIG. 1 is a front view of a magnetic pouch mount according to one or more embodiments shown and described herein.
Figure 2:
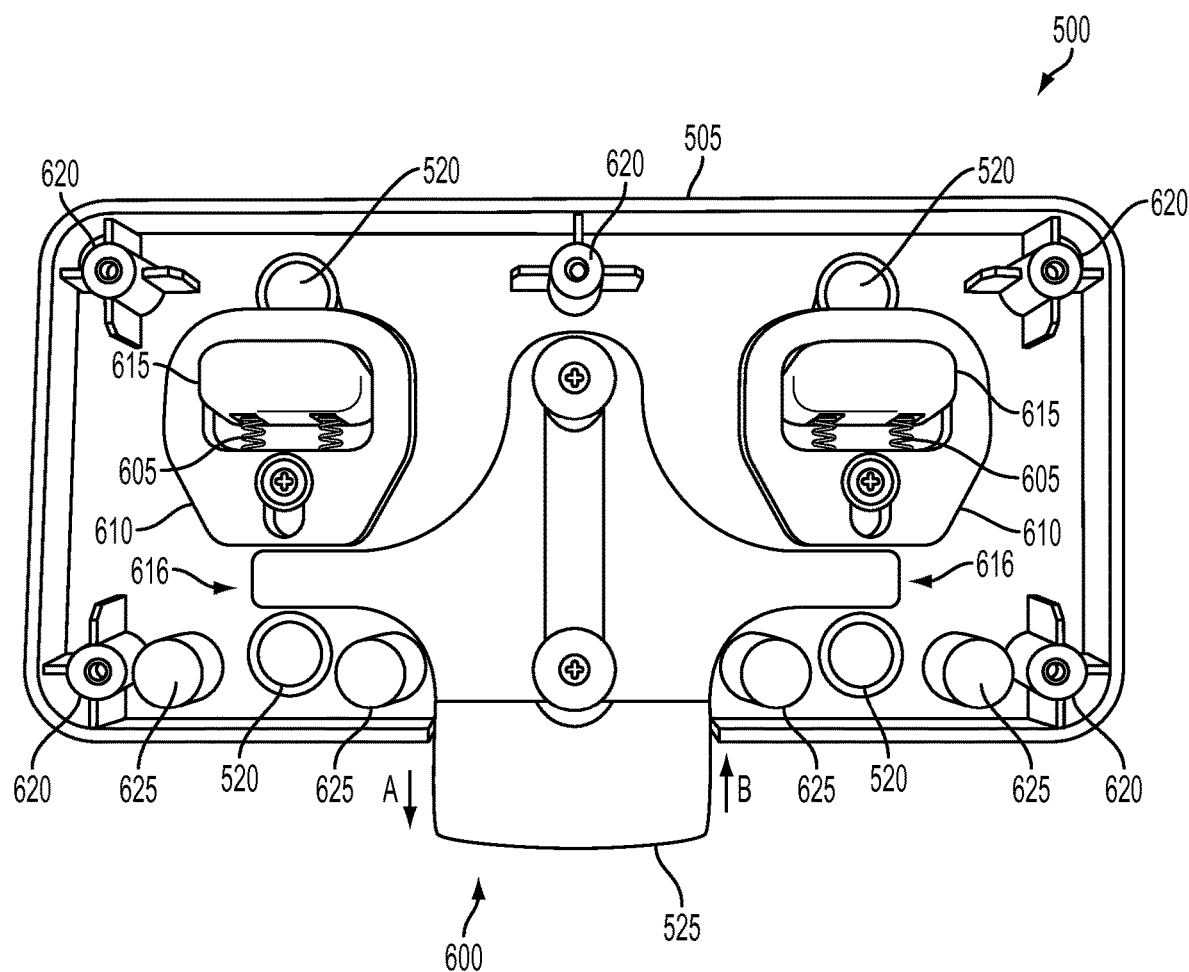
FIG. 2 is a rear view of the magnetic pouch mount according to one or more embodiments shown and described herein.

Referring now to FIG. 1, a front view of a magnetic pouch mount 500 is shown in a retention position. The magnetic pouch mount 500 may include an alignment plate 505, one or more mounting apertures 510, a mount indicia 540, one or more latch apertures 530, and a latch 600 (FIG. 2). The latch 600 may include a latch handle 525 and one or more latch teeth 535. Each latch tooth 535 may protrude into each latch aperture 530 as shown in FIG. 1 in the retention position.

Each latch tooth may be crash-ready. As used throughout, "crash-ready" means that a device, equipment, mount, track, fastening devices, or a structure may be configured to survive an inertial force, an impact, a vehicle crash, or a sudden vehicle maneuver and retain functionality afterwards where the force exerted upon the device, equipment, mount, track, fastening devices, or a structure may exceed about 15 Gs (i.e., units of gravitational force or g-force) in a fore-aft direction and exceed about 17 Gs in a lateral direction. In one embodiment, the force exerted upon the device, equipment, mount, track, fastening devices, or a structure may exceed about 22 Gs (i.e., units of gravitational force or g-force) in a fore-aft direction and exceed about 26 Gs in a lateral direction.

A latch axis 550 may be centered on each of the one or more latch apertures 530. The one or more mounting apertures 510 may be positioned such that they are a mirror image of each other across the latch axis 550. A mounting aperture axis 555 bisects each of the one or more mounting apertures 510. The mounting aperture axis 555 may be substantially orthogonal to the latch axis 550.

Figure 25:
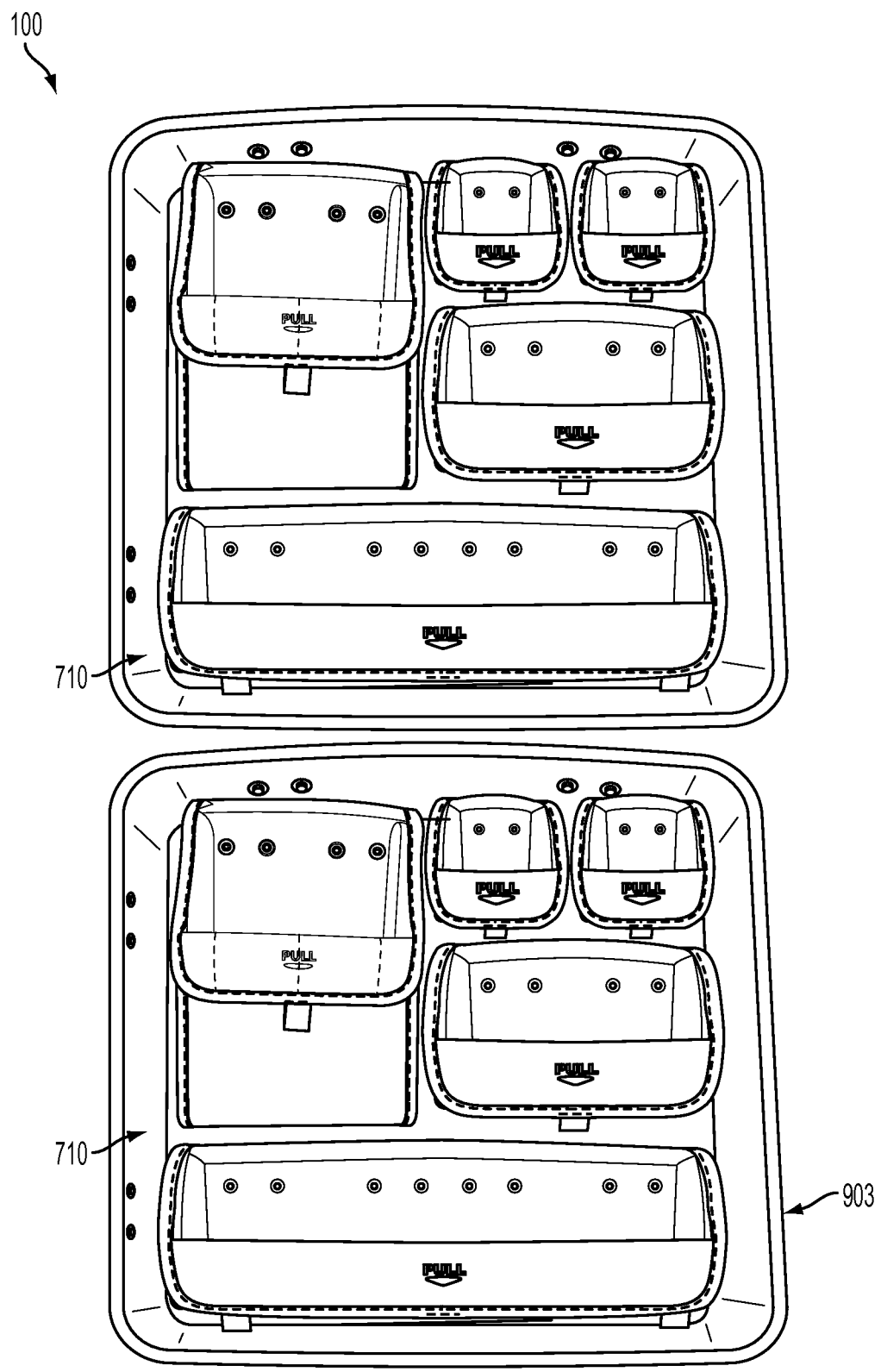
FIG. 25 is another top view of the softwall according to one or more embodiments shown and described herein.

The mount indicia 540 may be used to indicate which pouch or combination of pouches should be secured to the magnetic pouch mount 500. As used throughout, the term "pouch" without a reference number indicates it may be a pouch 900 (FIG. 3), a single pouch 901 (FIG. 8), a tall pouch 902 (FIG. 11), and a long pouch 903 (FIG. 25). In one embodiment, the pouch may have corresponding indicia to allow for ease in matching the pouch to the magnetic pouch mount 500. In another embodiment, a plate surface 545 of the alignment plate 505 may be color coded to allow for ease in matching the pouch to the magnetic pouch mount 500.

FIG. 2 is a rear view of the magnetic pouch mount 500 with an optional protective cover (not shown) removed to identify the internal components of the magnetic pouch mount 500. The optional protective cover may be used to seal the magnetic pouch mount 500 from dust and other contaminates. The latch 600 may include the latch handle 525 and one or more transitioning blocks 610. Each transitioning block 610 may be coupled to each latch tooth 535 of FIG. 1. Each transitioning block 610 may be slidably coupled with a latch aperture housing 615. A tooth aperture (not shown) in the latch aperture housing 615 may allow each latch tooth 535 to transition between the retention position and a release position as explained in greater detail below.

The one or more transitioning blocks 610 are biased in the retention position (i.e., each latch tooth 535 protruding into each latch aperture 530) by one or more latch springs 605. Each transitioning block 610 may be biased by at least one latch spring 605 in the retention position. The latch handle 525 may include one or more latch arms 616. Each latch arm 616 may be coupled to the each transitioning block 610. In one embodiment, each latch arm 616 may be in contact with each transitioning block 610. When the transitioning block 610 is biased in the retention position, the latch handle 525, through the contact of the transitioning block 610 with the latch arm 616, is biased in the direction of arrow "A".

The latch handle 525 may be transitioned from the retention position shown in FIG. 1 to the release position. In the release position, the latch handle 525 may be transitioned in the direction of arrow "B." The latch arms 616 may exert a release force on the transitioning blocks 610 thereby overcoming the biasing force of the one or more latch springs 605 and retracting each latch tooth 535 out of the latch aperture 530. The operation of the latch 600 in relation to the pouch is described in greater detail below.

Still referring to FIG. 2, the alignment plate 505 may include one or more plate mounting points 620 and one or more mounting aperture housings 625. Each plate mounting point 620 may be used to secure the alignment plate 505 to a surface or device. Each mounting aperture housing 625 may define each mounting aperture 510 of FIG. 1 in the alignment plate 505. The alignment plate 505 may also include one or more magnetic areas 520 disposed within the alignment plate 505. Each magnetic area 520 may include any device or object that creates or maintains a magnetic field. The device or object that creates or maintains a magnetic field may include a magnet, a rare earth magnet, an electromagnet, or a magnetized metal. In one embodiment, each magnetic area 520 may not be visible when viewing the plate surface 545.

Referring to FIGS. 1 and 2, the magnetic pouch mount 500 may be configured to secure the pouch to a surface 1800 or device. For example, the surface 1800 or device may include, but is not limited to, a vehicle wall, a vehicle structure, a building wall, a building structure, a cot, a chair, a bag, a cart, or the like. The magnetic pouch mount 500 may be configured to crash-ready.

Figure 3:
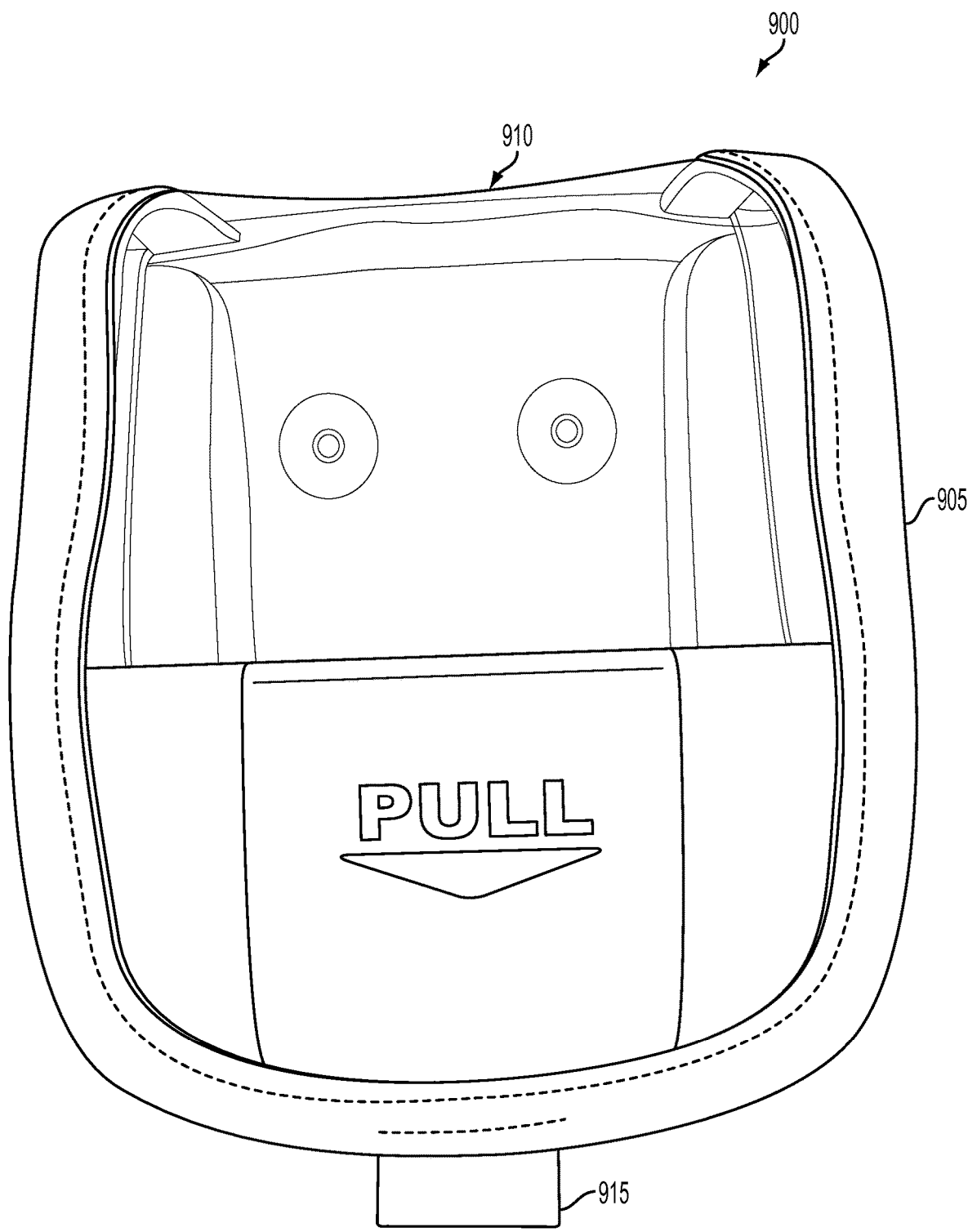
FIG. 3 is a front view of a pouch according to one or more embodiments shown and described herein.
Figure 7:
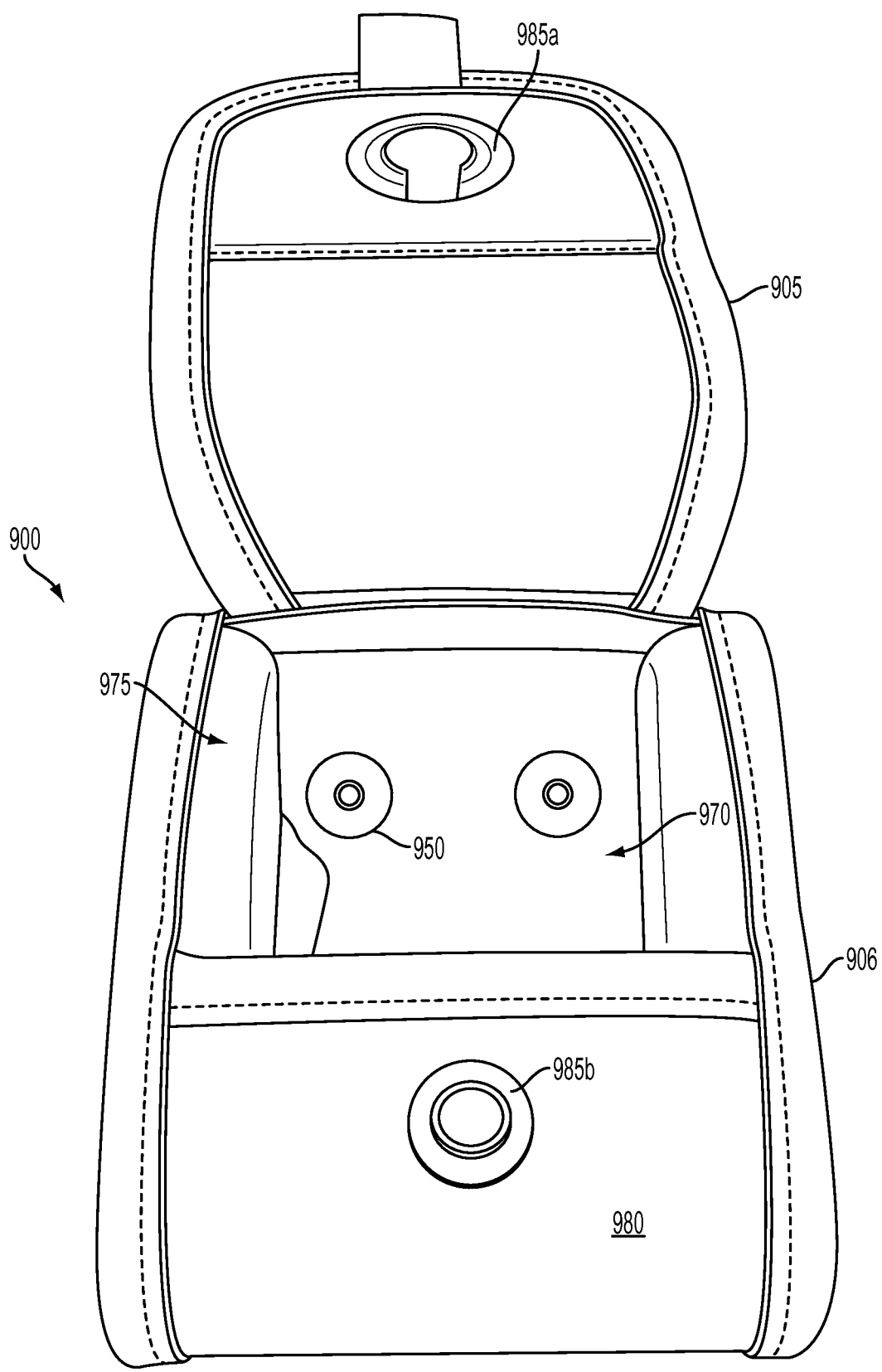
FIG. 7 is another front view of the pouch according to one or more embodiments shown and described herein.

FIG. 3 is a front view of the pouch 900. The pouch 900 may include a flap 905. The flap 905 may include a flexible window 910 and a tab 915. The flexible window 910 may be made from plastic or acrylic or the like and may allow viewing of the items in an interior compartment 970 (FIG. 7). The dimensions of the pouch 900 may be from about 4 in tall to about 7 in tall and from about 2 in wide to about 6 in wide. All pouches may have about the same thickness which may be from about 2 in thick to about 6 in thick. In one embodiment, the pouch may have a thickness from about 2 in thick to about 8 in thick if only one half shell is configured with removable means as described below.

Figure 4:
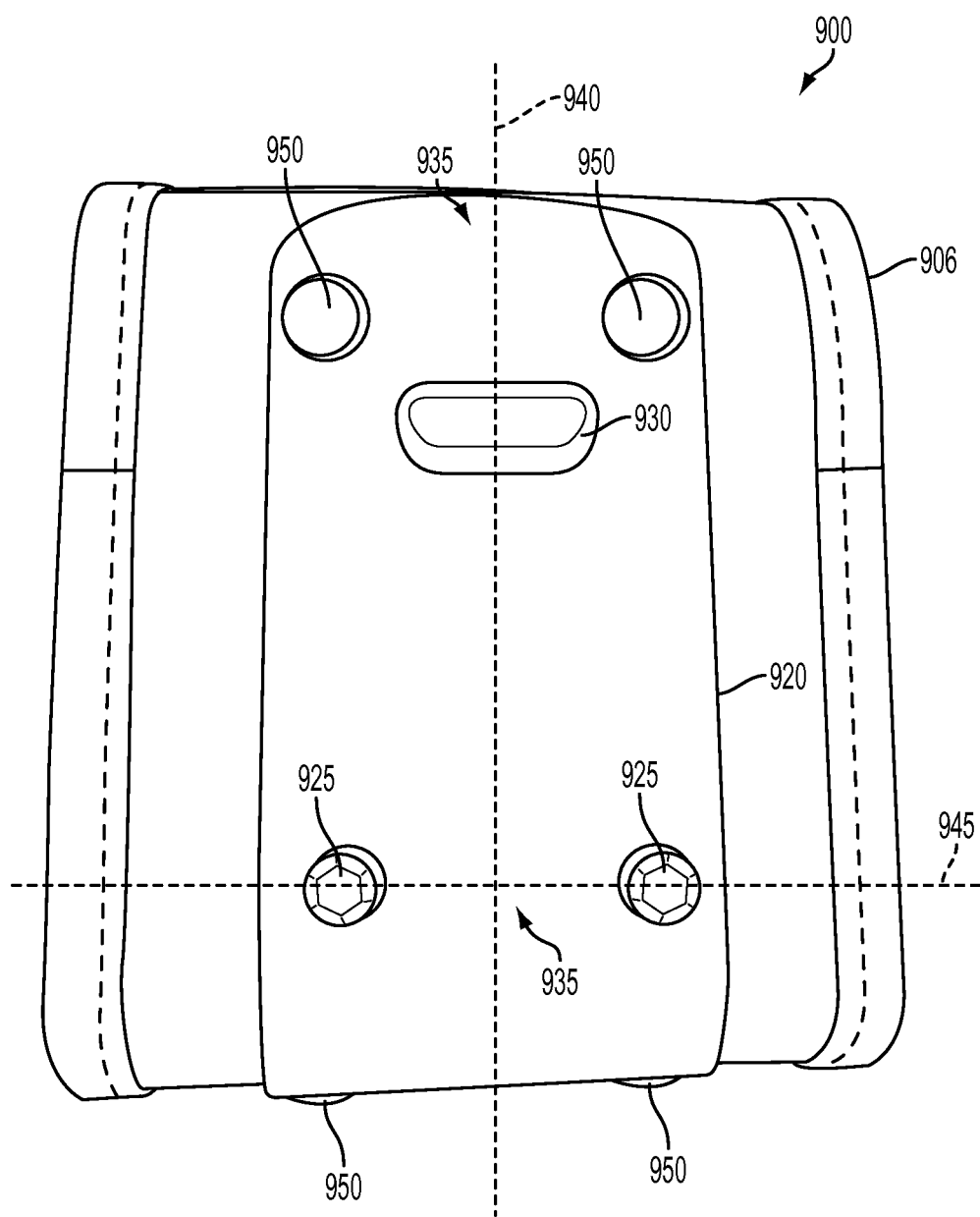
FIG. 4 is a rear view of the pouch according to one or more embodiments shown and described herein.

FIG. 4 is a rear view of the pouch 900. The pouch 900 may include a container 906 and a mounting bracket 920. The container 906 is discussed in greater detail below in relation to FIG. 7. The mounting bracket 920 may include one or more alignment pegs 925, a catch 930, and one or more bracket magnetic areas 935. The one or more alignment pegs 925 may be configured to slidably couple with the one or more mounting apertures 510 shown in FIG. 1. The catch 930 may be configured to removably couple with the latch aperture 530 shown in FIG. 1. The one or more bracket magnetic areas 935 may be disposed within the mounting bracket 920 and configured to induce an attractive magnetic force with the one or more magnetic areas 520 shown in FIG. 2 when the pouch 900 is in proximity to the magnetic pouch mount 500. In other words, the one or more bracket magnetic areas 935 and the one or more magnetic areas 520 may be polar opposites of each to induce the attractive magnetic force between them. For example, when the pouch 900 is placed in proximity to the magnetic pouch mount 500, the attractive magnetic force will align and couple the pouch 900 to the magnetic pouch mount 500. In another embodiment, the one or more magnetic areas 520 may be an electromagnet and the one or more bracket magnetic areas 935 may be a ferrous metal that is attracted to the electromagnet with the electromagnet is energized.

The mounting bracket 920 may be coupled to the container 906 of the pouch 900 by one or more fastening means 950. "Fastening means", as used throughout, may include, but are not limited to, screws, bolts, rivets, nails, adhesive, Velcro, weld, epoxy, or any similar devices that mechanically joins or affixes two or more objects together. The mounting bracket 920 may be configured to removably couple with half of the magnetic pouch mount 500 shown in FIG. 1. The pouch 900 is shown in FIG. 4 with only one mounting bracket 920. The pouch 900 may couple with half of one magnetic pouch mount 500 or two pouches 900 may couple, side by side, with one magnetic pouch mount 500.

A catch axis 940 may be centered on the catch 930. The one or more alignment pegs 925 may be positioned such that they are a mirror image of each other across the catch axis 940. An alignment peg axis 945 may bisects each of the one or more alignment pegs 925. The catch axis 940 may be substantially orthogonal to the alignment peg axis 945.

Figure 5:
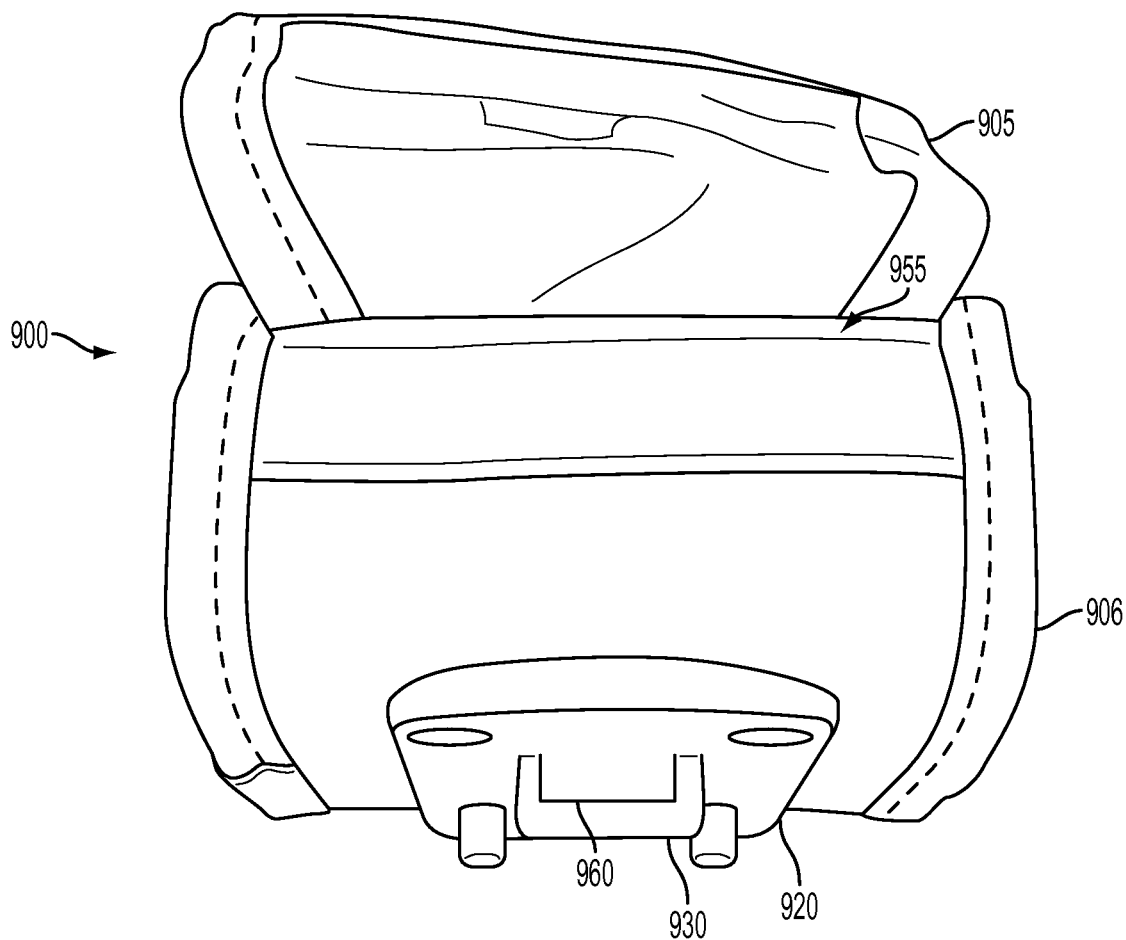
FIG. 5 is a top view of the pouch according to one or more embodiments shown and described herein.

FIG. 5 is a top view of the pouch 900. The flap 905 may be hingedly coupled to the container 906 by a pouch hinge 955. In one embodiment, the pouch hinge 955 may be constructed from the same material that the container 906 is constructed from and resemble a piano hinge. Other examples of mechanisms to hingedly couple the flap 905 and the container 906 may include, but are not limited to, a butt hinge, a strap hinge, a t-hinge, and a double-acting hinge. The catch 930 on the mounting bracket 920 may include a tooth aperture 960 configured to receive the latch tooth 535 (FIG. 1).

Figure 6A:
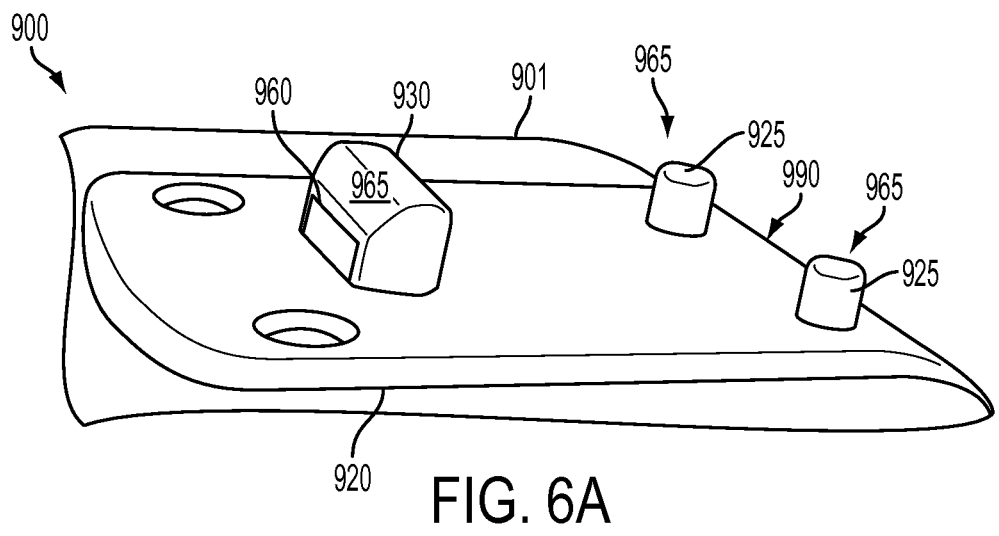
FIG. 6A is an isometric view of the mounting bracket according to one or more embodiments shown and described herein.

FIG. 6A is an isometric view of the mounting bracket 920. The catch 930 may be configured to removably couple with the latch aperture 530 (FIG. 1) and slidably couple with the latch aperture housing 615 of FIG. 2. A rounded surface 965 may be configured to transition the latch tooth 535 from the retention position to the release position when the catch 930 is coupled with the latch aperture 530 with actuation of the latch handle 525. The rounded surface 965 may be an inclined edge, a tapered edge, or the like. The one or more alignment pegs 925 may also include a rounded surface 965 to slidably couple each alignment peg 925 into each mounting aperture 510 of FIG. 1. The rounded surface 965 may aid in aligning the catch 930 with the latch aperture 530 and aid in aligning the each alignment pegs 925 with each latch aperture 530.

Figure 6B:
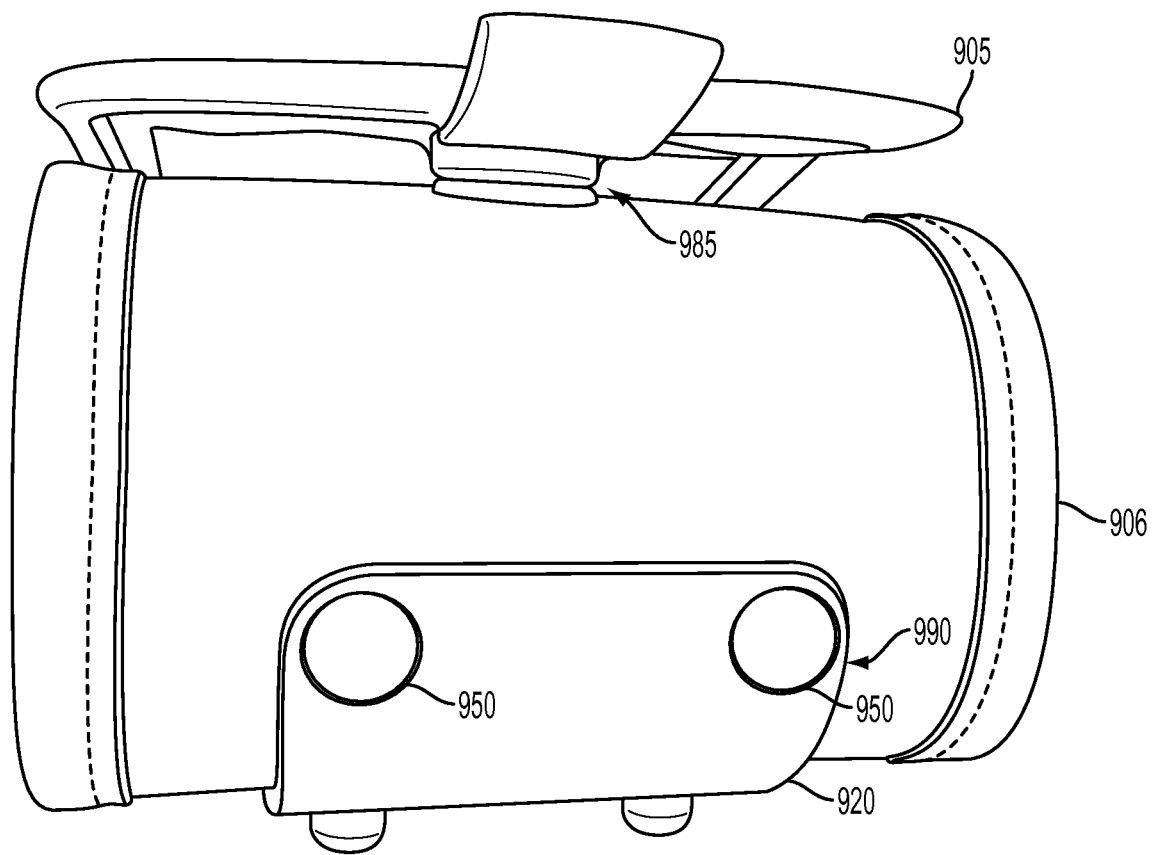
FIG. 6B is a bottom view of the pouch according to one or more embodiments shown and described herein.

FIG. 6B is a bottom view of the pouch 900. The mounting bracket 920 may include an L-shaped extension 995 that is configured to wrap under the container 906 and support some of a weight of the items in the interior compartment 970 shown in FIG. 7. The fastening means 950 may be used to couple the L-shaped extension 995 to the container 906. A securing means 985 may be used to secure the flap 905 to the container 906. Securing means are discussed in greater detail below.

FIG. 7 is another front view of the pouch 900 with the flap 905 in an open position. The container 906 may include a partial enclosure and an opening 975. The partial enclosure and the opening 975 may define an interior compartment 970 and the opening 975 may allow items to be received into the interior compartment 970. In one embodiment, the container 906 may include a flexible window to allow viewing of the items in the interior compartment 970. The flap 905 may be sized to cover the opening 975 and at least a portion of an outer surface 980 of the container 906. The flap 905 may be made from the same material as the container 906. In one embodiment, and as shown in FIGS. 7, 8, 10, 11, and 15, the fastening means 950 may be coupled through the container 906 to the mounting bracket 920 (not shown). In another embodiment, the container 906 may be a water tight container. In this embodiment, the fastening means may not penetrate the container 906 to ensure that the container 906 remains water tight. The fastening means used to maintain a water tight container may be adhesive, weld, epoxy, or any similar devices that mechanically joins or affixes two or more objects together without creating or using an aperture.

The pouch 900 may also include securing means 985 (FIG. 6B) to secure the flap 905 to the outer surface 980 of the container 906. Securing means 985 may include Velcro®, a button snap, a button and hole, a hook and bar, a zipper, a snap buckle, a buckle, a Fidlock® Slider fastener, a Fidlock® SNAP fastener, a Fidlock® SNAP buckle fastener, a Fidlock® SNAP push fastener, a Fidlock® SNAP pull fastener, a Fidlock® MINI TURN fastener, a Fidlock® Hook fastener, or the like. The securing means 985 may be crash-ready.

In one embodiment, the securing means 985 may include a snap 985a and a post 985b. Both the snap 985a and the post 985b may include a set of magnets that are polar opposites of each other such that when the snap 985a and the post 985b are in close proximity to each other, the snap 985a is attracted to and couples with the post 985b. Transitioning the flap from the open position to the closed position and vice versus are performed in a cycle. The transition from the open position to the closed position part of the cycle may include:

Phase 1: During the approach of snap 985a to the post 985b, i.e., in the effective region of the magnetic forces between the set of magnets, the snap 985a and the post 985b are urged laterally into the closed position with maximum attraction of the attractive magnetic force between the set of magnets.

Phase 2: The attractive magnetic force between the set of magnets in the closed position overcomes the forced needed to couple the snap 985a with the post 985b. In other words, the attractive force of the magnets transitions the flap 905 from the open position to the closed position and the coupling of the snap 985a and the post 985b overcomes the attractive magnetic force to retain the flap 905 in the closed position.

In the closed position, the snap 985a and the post 985b are coupled together such that any item in the interior compartment 970 is retained within the interior compartment 970 until the flap is transitioned from the closed position to the open position. The transition from the closed position to the open position of the cycle may include:

Phase 3: The attractive magnetic force between the set of magnets is weakened by lateral displacement of the snap 985a in relation to the post 985b. In other words, a user may grab the tab 915 shown in FIG. 3 and pull down on the flap 905 thereby causing the set of magnets in the snap 985a and the post 985b to no longer be adjacent to each other. The attractive magnetic force gets weaker as the snap 985a and the post 985b are separated by an increase in distance Phase 4: Together with this lateral displacement, the post 985b is removed from the snap 985a such that the snap 985a is moved out of engagement with the post 985b by a lateral displacement thereby separating the snap 985a and the post 985b from each other.

The snap 985a and the post 985b incorporating a set of magnets allows a user to release the flap 905 into a freefall and the flap 905, through the attractive magnetic force between the set of magnets, will transition from the open position to the closed position and will couple with the outer surface 980 of the container 906 without further intervention on the part of the user. Further explanation and examples may be found in U.S. Pat. No. 8,430,434 which is herein incorporated by reference in its entirety.

Figure 8:
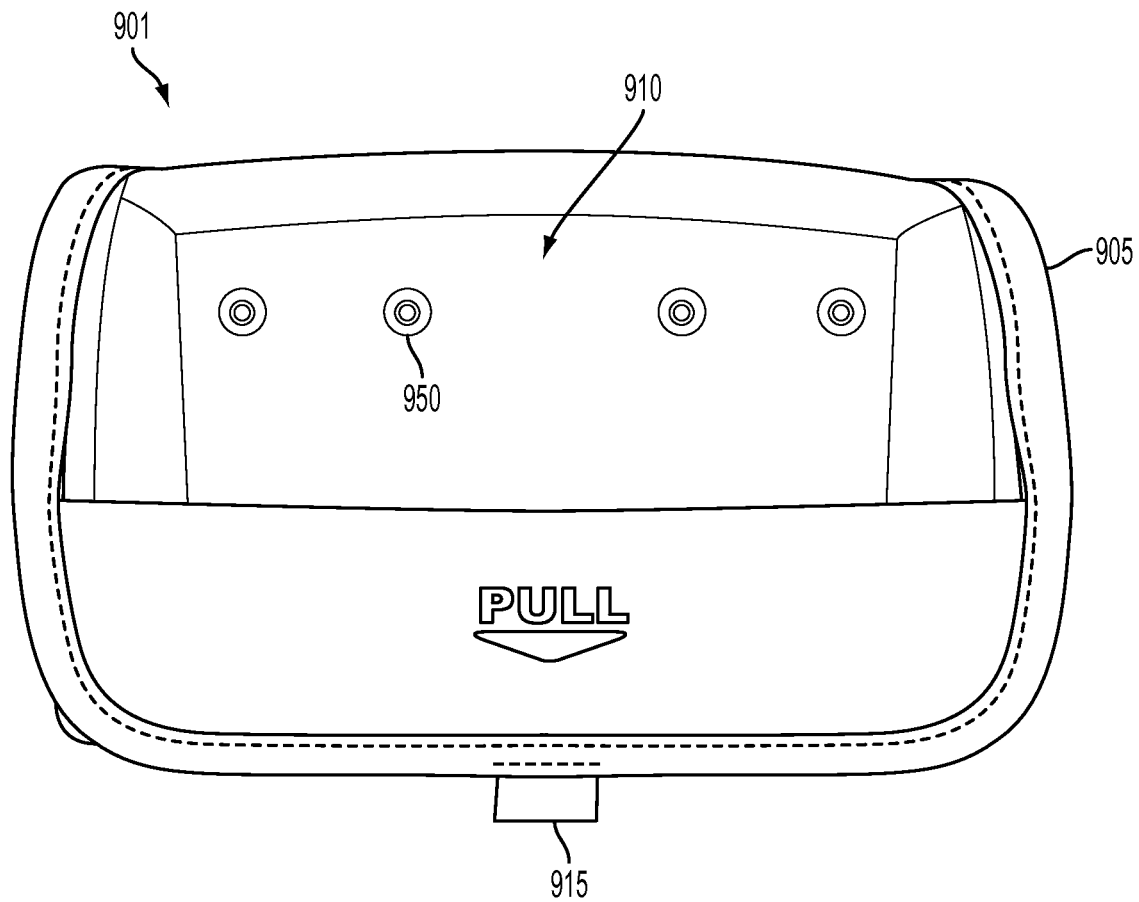
FIG. 8 is a front view of a single pouch according to one or more embodiments shown and described herein.

FIG. 8 is a front view of a single pouch 901. The single pouch 901 may include the flap 905, the tab 915, and the flexible window 910.

Figure 9:
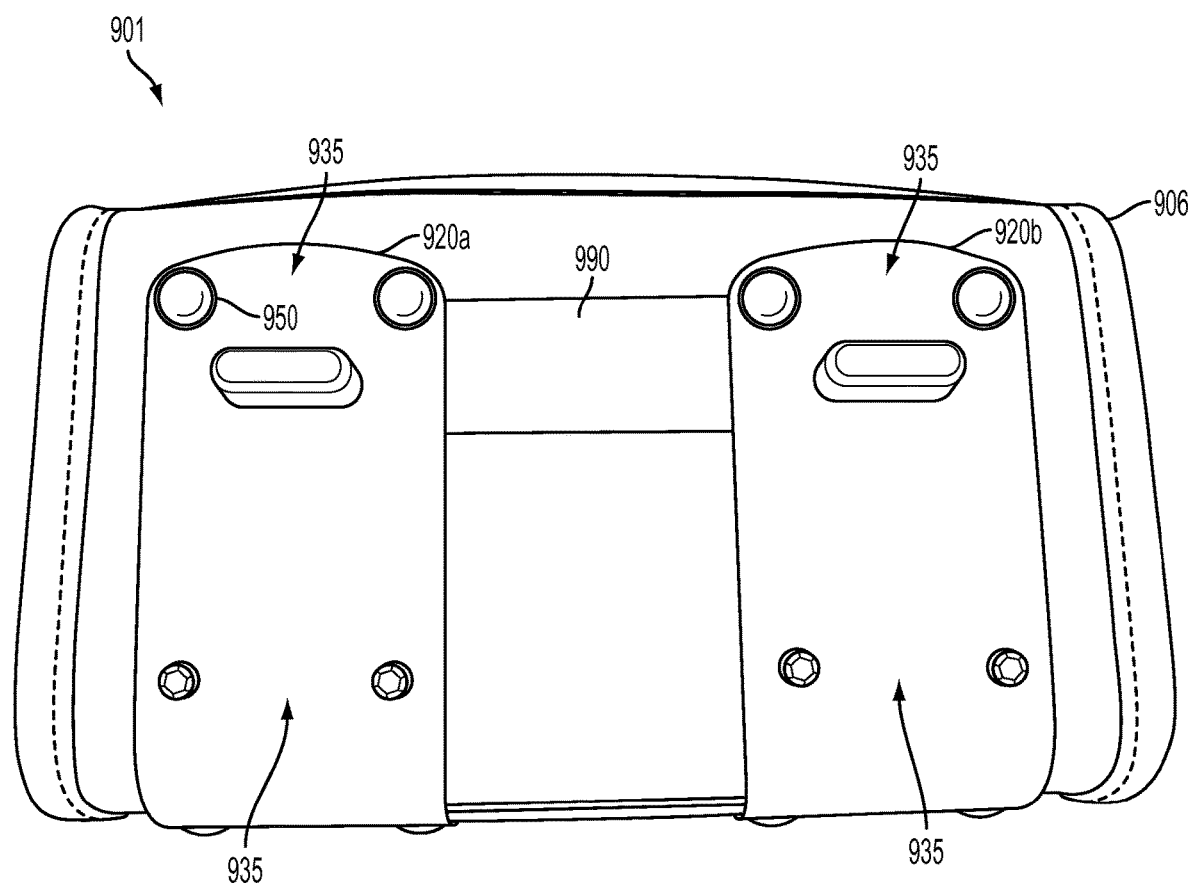
FIG. 9 is a rear view of the single pouch according to one or more embodiments shown and described herein.

FIG. 9 is a rear view of the single pouch 901. The single pouch 901 may include a first mounting bracket 920a and a second mounting bracket 920b coupled to the container 906. The first mounting bracket 920a and the second mounting bracket 920b may be coupled together with a frame 990. The first mounting bracket 920a and the second mounting bracket 920b are configured to couple with a magnetic pouch mount 500 shown in FIG. 1. The first mounting bracket 920a and the second mounting bracket 920b may include the one or more bracket magnetic areas 935.

Figure 10:
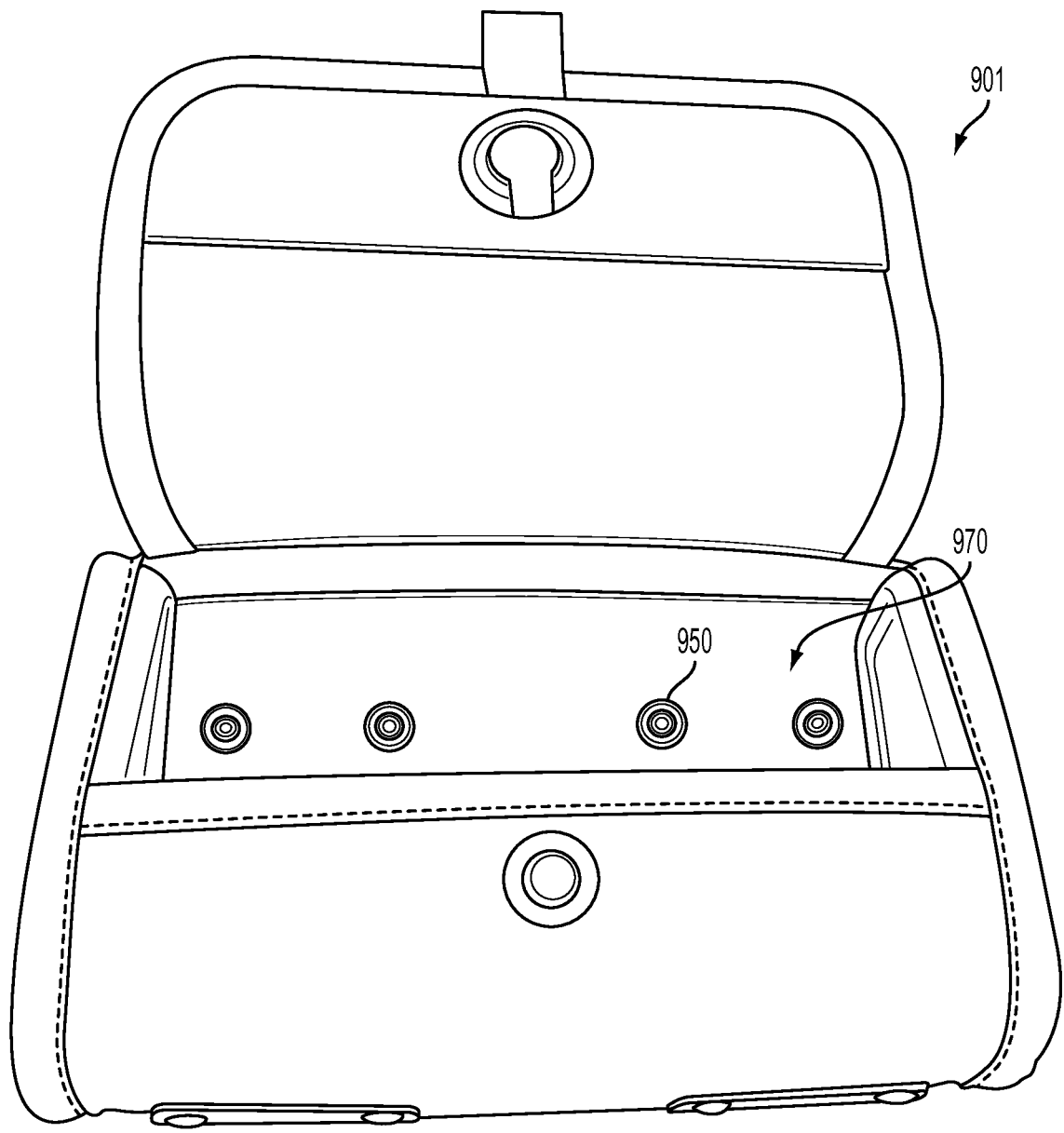
FIG. 10 is another front view of the single pouch according to one or more embodiments shown and described herein.

FIG. 10 is another front view of the single pouch 901 with the flap 905 in an open position. The interior compartment 970 of the single pouch 901 is about twice as much volume as the pouch 900 of FIG. 7. The dimensions of the single pouch 901 may be from about 4 inches (in) tall to about 7 in tall and from about 5 in wide to about 10 in wide.

Figure 11:
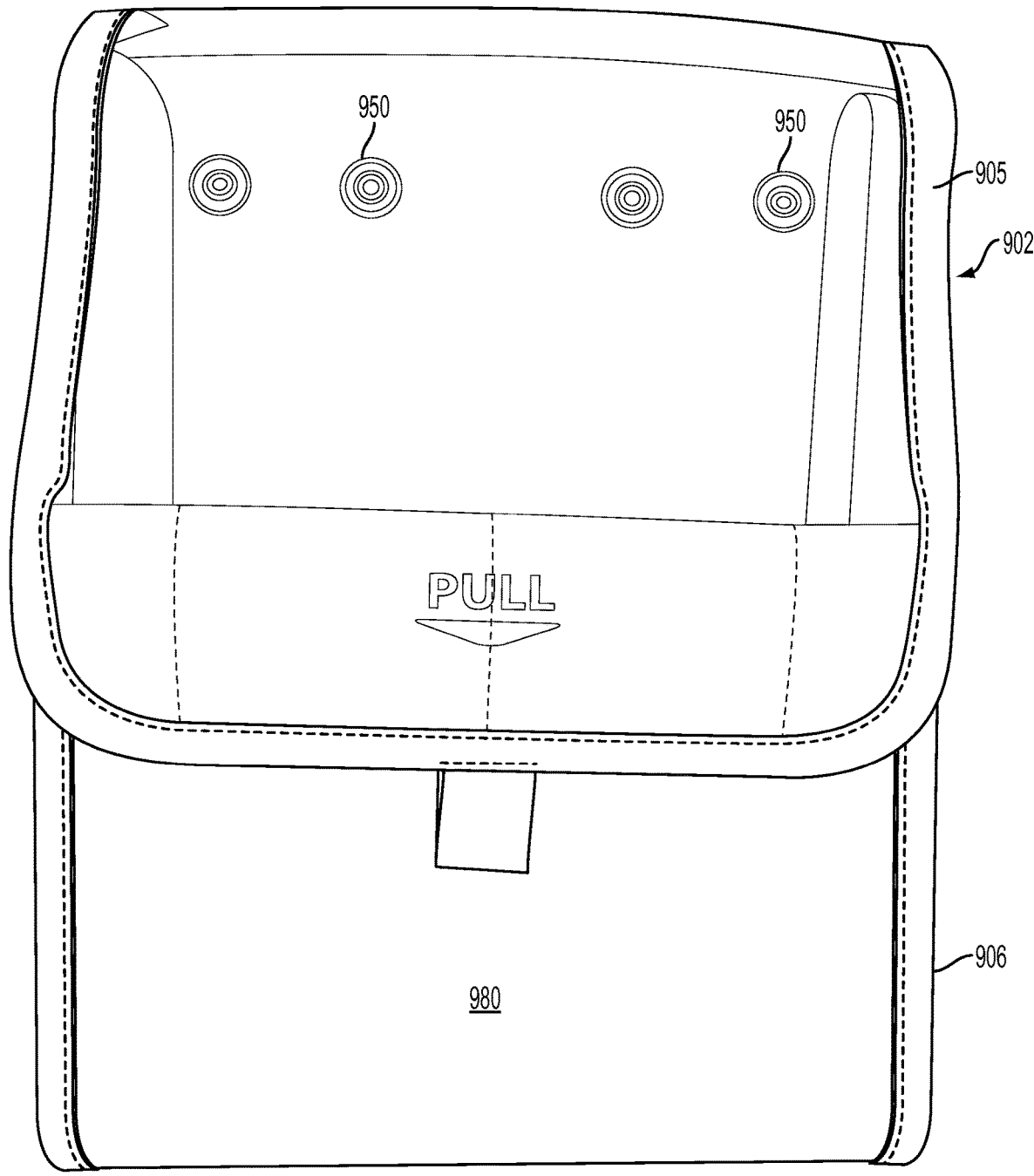
FIG. 11 is a front view of a tall pouch according to one or more embodiments shown and described herein.

FIG. 11 is a front view of a tall pouch 902. The tall pouch 902 may include the flap 905, the tab 915, and the flexible window 910. The outer surface 980 of the container 906 extends below the flap 905 when the flap is in the closed position.

Figure 12:
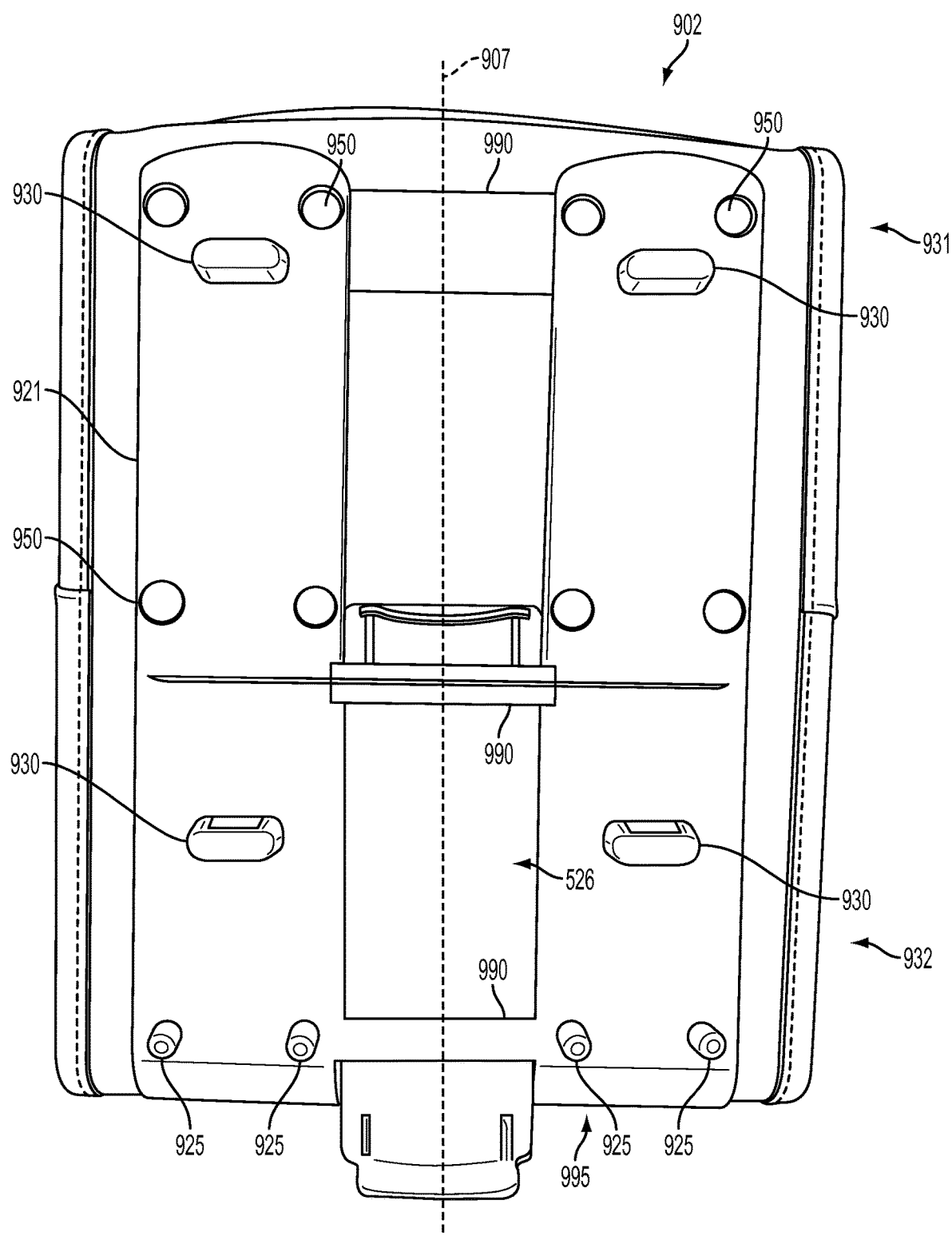
FIG. 12 is a rear view of the tall pouch according to one or more embodiments shown and described herein.

FIG. 12 is a rear view of the tall pouch 902. The container 906 may be coupled to a modified mounting bracket 921 by the use of fastening means 950. The modified mounting bracket 921 may include the L-shaped extension 995, the one or more alignment pegs 925, the frame 990, one or more catches 930, and a latch adapter 526. The latch adapter 526 is captured between the container 906 and the frame 990. The latch adapter 526 transitions along a bracket axis 907. The bracket axis is centrally and vertically located along the modified mounting bracket 921. The latch adapter 526 is described in greater detail below in relation to FIGS. 13 and 15.

Figure 13:
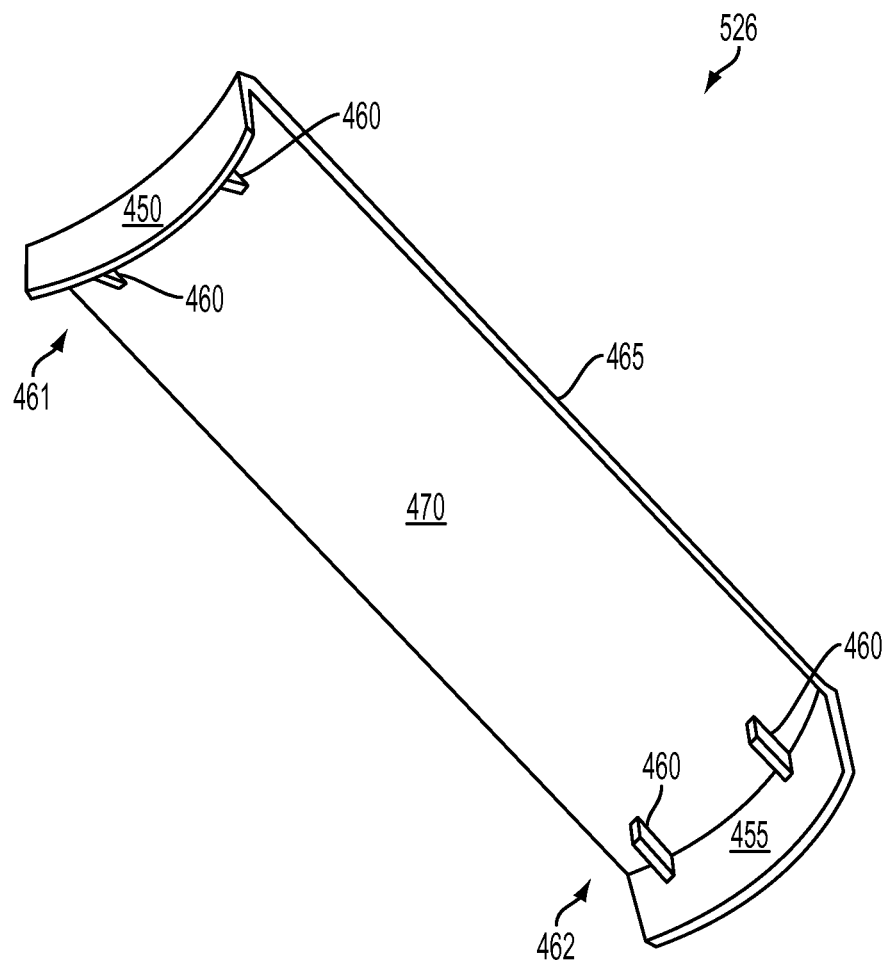
FIG. 13 is an isometric view of a latch adapter according to one or more embodiments shown and described herein.
Figure 14:
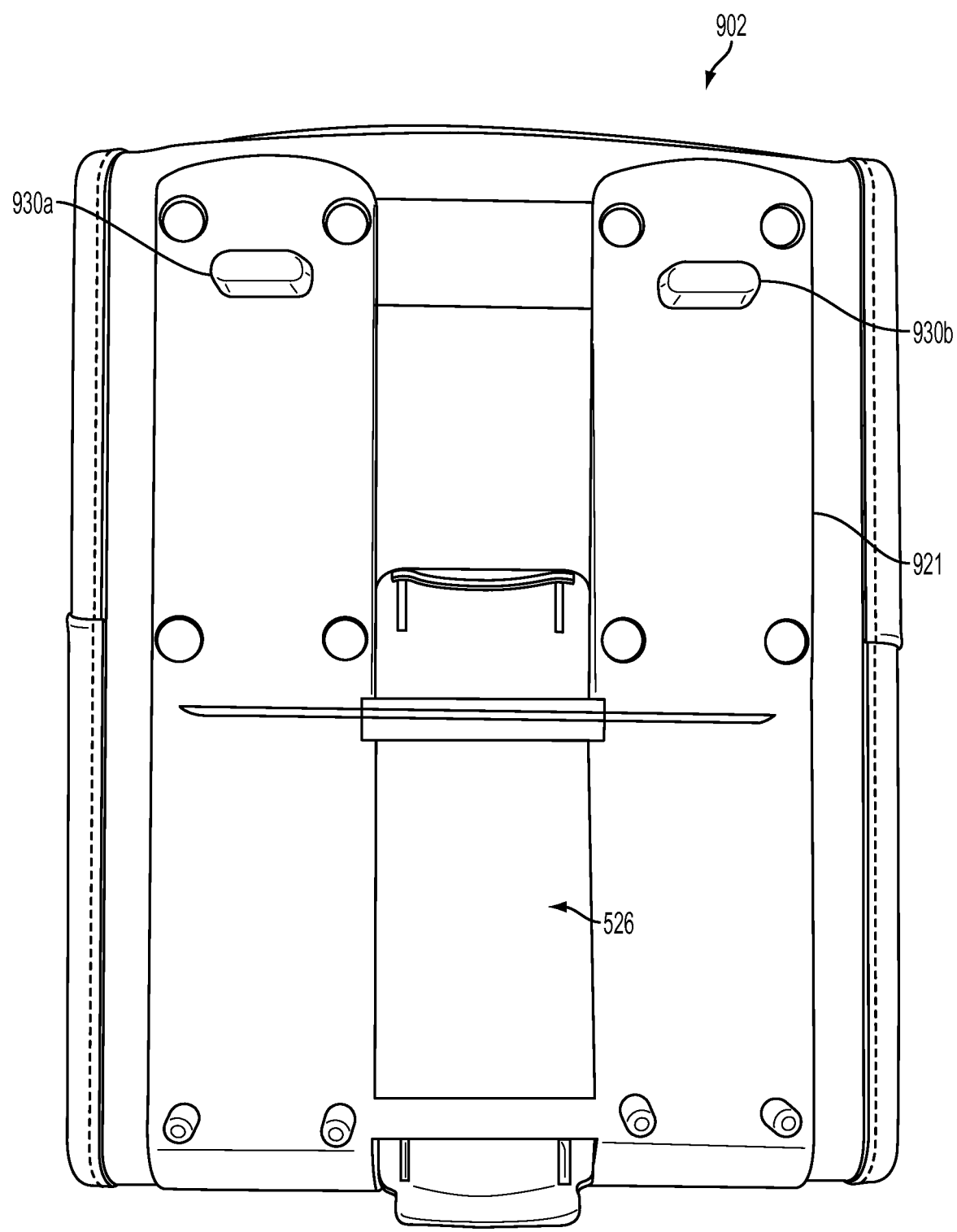
FIG. 14 depicts the latch adapter in an actuate position according to one or more embodiments shown and described herein.

FIG. 13 is an isometric view of the latch adapter 526. The latch adapter 526 may include a first latch handle engagement surface 450 and a second latch handle engagement surface 455, a plurality of stops 460, and a sliding structure 465 having a sliding surface 470. The first latch handle engagement surface Referring to FIGS. 12, 13, and 14, the plurality of stops are configured to limit an amount of travel of the latch adapter 526 between a rest position, shown in FIG. 12, and an actuate position, shown in FIG. 14. In the rest position, an upper plurality of stops 461 are in contact with the frame 990 as shown in FIG. 12. In the actuate position, a lower plurality of stops 462 are in contact with the frame 990 as shown in FIG. 14. The sliding surface 470 allows for a smooth transition between the rest position and the actuate position. The sliding surface 470 may be slidably coupled with the frame 990. The frame 990 may define the rest position and the actuate position.

FIG. 14 is a rear view of another embodiment of the tall pouch 902. In this embodiment, there may be only two catches, a first catch 930a and a second catch 930b. The latch adapter 526 is shown in the actuate position. This embodiment may negate the need to secure the tall pouch 902 to a lower magnetic pouch mount 500 as described below in relation to FIGS. 12, 13, and 17.

Figure 15:
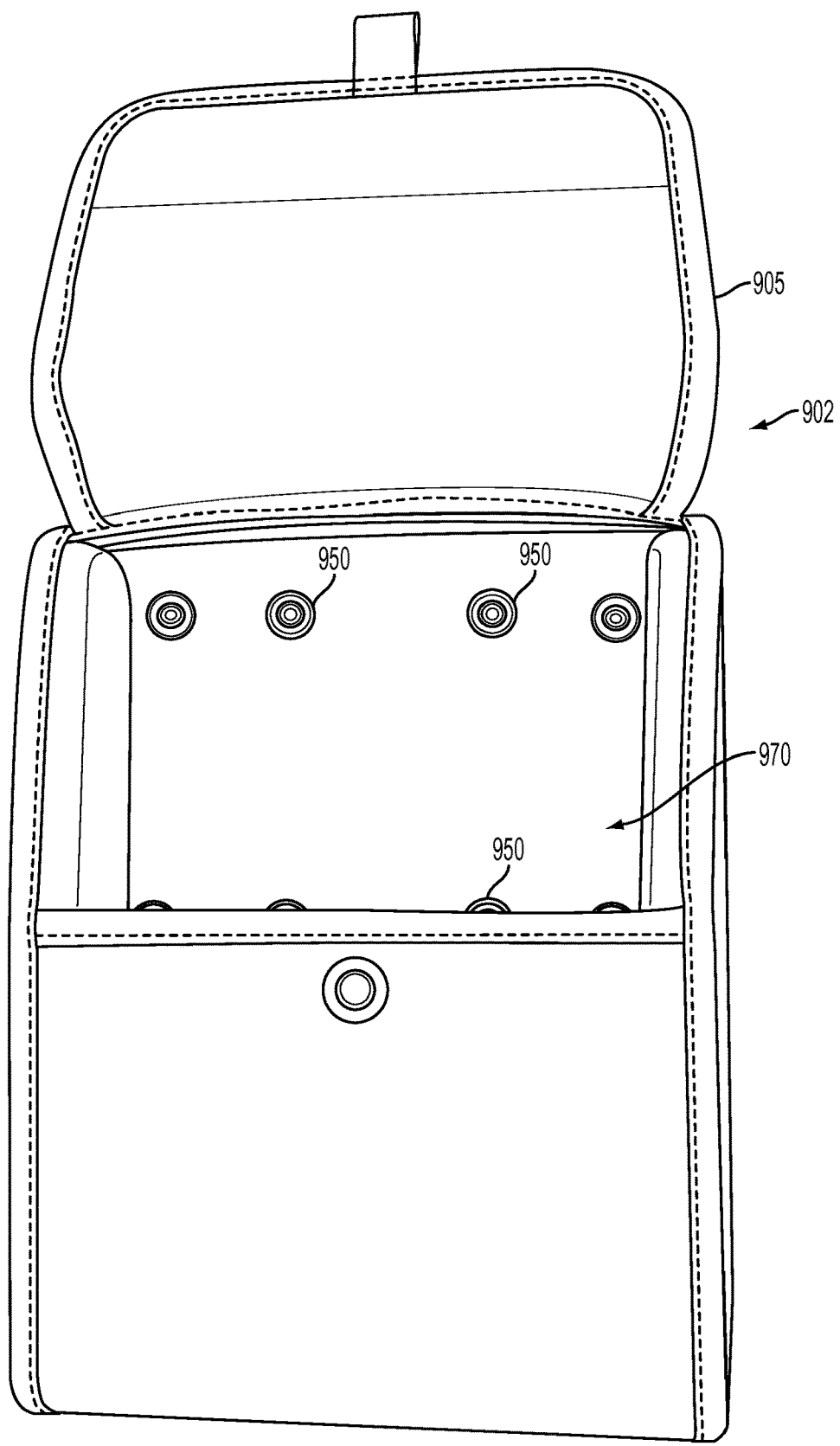
FIG. 15 is another front view of the tall pouch according to one or more embodiments shown and described herein.

FIG. 15 is another front view of the tall pouch 902 with the flap 905 in an open position. The interior compartment 970 of the tall pouch 902 is about twice as much volume as the single pouch 901 of FIG. 8. The dimensions of the tall pouch 902 may be from about 8 in tall to about 12 in tall and from about 8 in wide to about 10 in wide.

Figure 16:
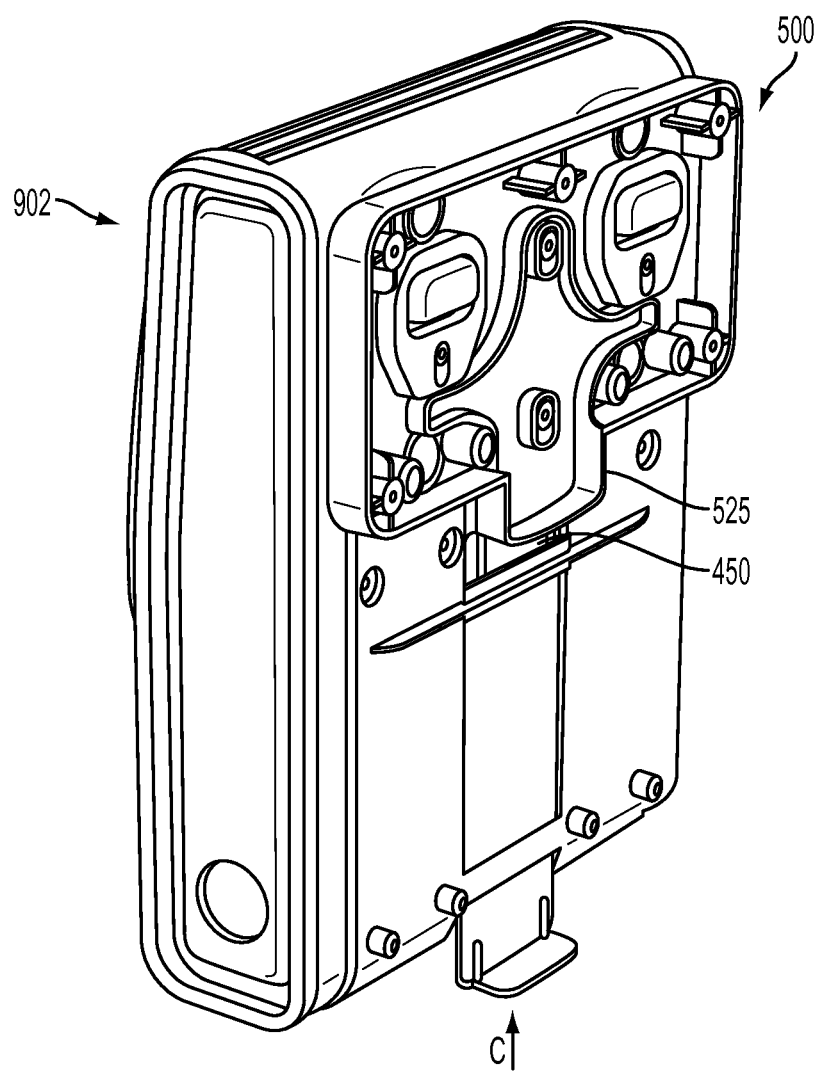
FIG. 16 is an isometric view of the tall pouch coupled to the magnetic pouch mount according to one or more embodiments shown and described herein.

FIG. 16 is an isometric view of the tall pouch 902 coupled to the magnetic pouch mount 500 of FIG. 1. Referring to FIGS. 13, 14, and 16, the tall pouch 902 may be removably coupled with a single magnetic pouch mount 500. The first latch handle engagement surface 450 may make contact with the latch handle 525. As the latch adapter 526 is transitioned from the rest position to the actuate position in the direction of arrow "C", the first latch handle engagement surface 450 transitions the latch 600 of FIG. 2 from the retention position to the release position thereby releasing the tall pouch 902 from the magnetic pouch mount 500. The one or more latch springs 605 (FIG. 2) bias the latch handle 525 in the retention position and the latch adapter 526 in the rest position.

Figure 17:
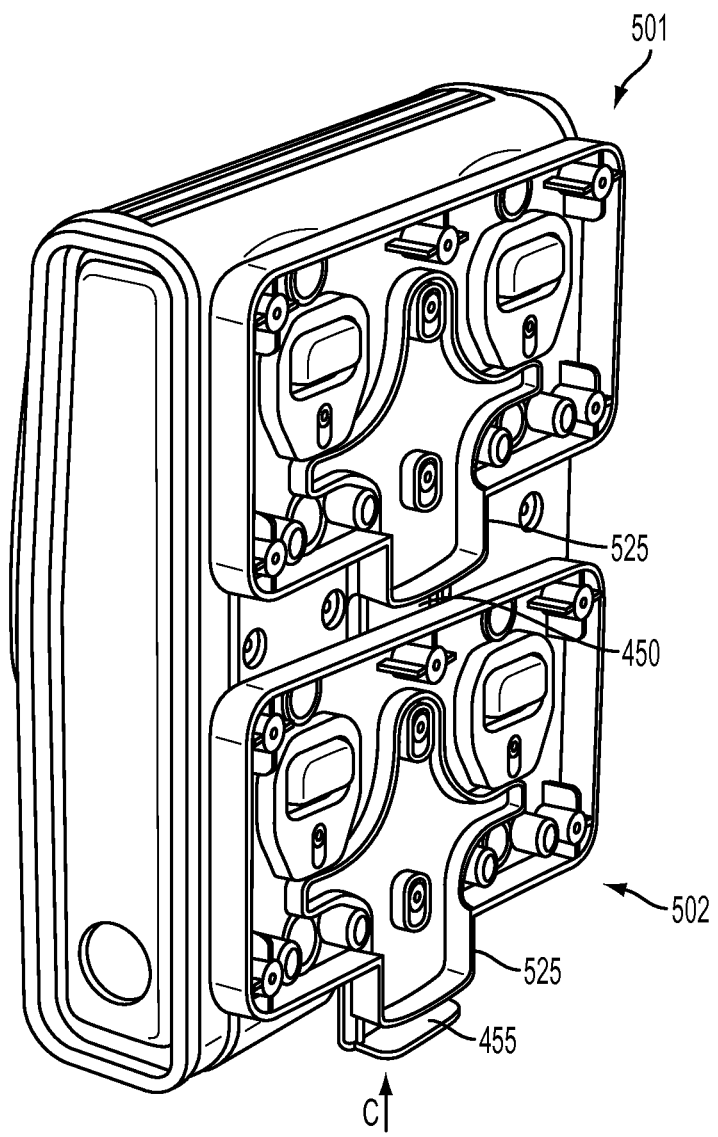
FIG. 17 is an isometric view of the tall pouch coupled to two magnetic pouch mounts according to one or more embodiments shown and described herein.

Referring to FIGS. 12, 13, and 17, in one embodiment, the tall pouch 902 may be removably coupled with two magnetic pouch mounts 500 (FIG. 1) wherein each magnetic pouch mount 500 is positioned vertically along the bracket axis 907 of FIG. 12 such that an upper magnetic pouch mount 501 (shown in FIG. 17) is removably coupled with an upper set of catches 931 (FIG. 12) and a lower magnetic pouch mount 502 (shown in FIG. 17) may be removably coupled with a lower set of catches 932 (FIG. 12). The first latch handle engagement surface 450 may make contact with the latch handle 525 of the upper pouch mount 501 and the second latch handle engagement surface 455 may make contact with the latch handle 525 of the lower pouch mount 502. As the latch adapter 526 is transitioned from the rest position to the actuate position in the direction of arrow "C", the first latch handle engagement surface 450 transitions the latch 600 of FIG. 2 of the upper magnetic pouch mount 501 from the retention position to the release position and simultaneously transitions the latch 600 of the lower magnetic pouch mount 502 from the retention position to the release position thereby releasing the tall pouch 902 from both the upper magnetic pouch mount 501 and the lower magnetic pouch mount 502. The one or more latch springs 605 (FIG. 2) bias the latch handle 525 in the retention position and the latch adapter 526 in the rest position.

Referring to FIGS. 1, 4, 9, 12, and 14, the pouch 900, the single pouch 901, the tall pouch 902, and the long pouch 903 (FIG. 25) are configured to removably couple with one or more magnetic pouch mounts 500. Each pouch may have a variant of the mounting bracket 920. Therefore, the operation of removably coupling the pouch to the magnetic pouch mount 500 is the same. The only difference is in the arrangement and/or orientation of two or more magnetic pouch mounts 500 to successfully couple the pouch 900, the single pouch 901, the tall pouch 902, and the long pouch 903 to a surface or device.

The operation of removably coupling the mounting bracket 920 with the magnetic pouch mount 500 will be described in relation to FIGS. 1 and 4. However, it should be understood that the description of the operation is not limited to only the structure of FIGS. 1 and 4. Referring now to FIGS. 1 and 4, the mounting bracket 920 may be removably coupled to the magnetic pouch mount 500 such that the latch axis 550 and the catch axis 940 are substantially parallel to each other. As the pouch 900 is moved into close proximity to the magnetic pouch mount 500, an attractive magnetic force between the one or more magnetic areas 520 (FIG. 2) and the one or more bracket magnetic areas both aligns the catch 930 with the latch aperture 530 and the one or more alignment pegs 925 with the one or more mounting apertures 510 and draws the mounting bracket 920 and the magnetic pouch mount 500 together to removably couple the two together. In one example, the pouch 900 could be released into a freefall in the vicinity of the magnetic pouch mount and the attractive magnetic force would draw in and removably couple the pouch 900 to the magnetic pouch mount 500.

Figure 18:
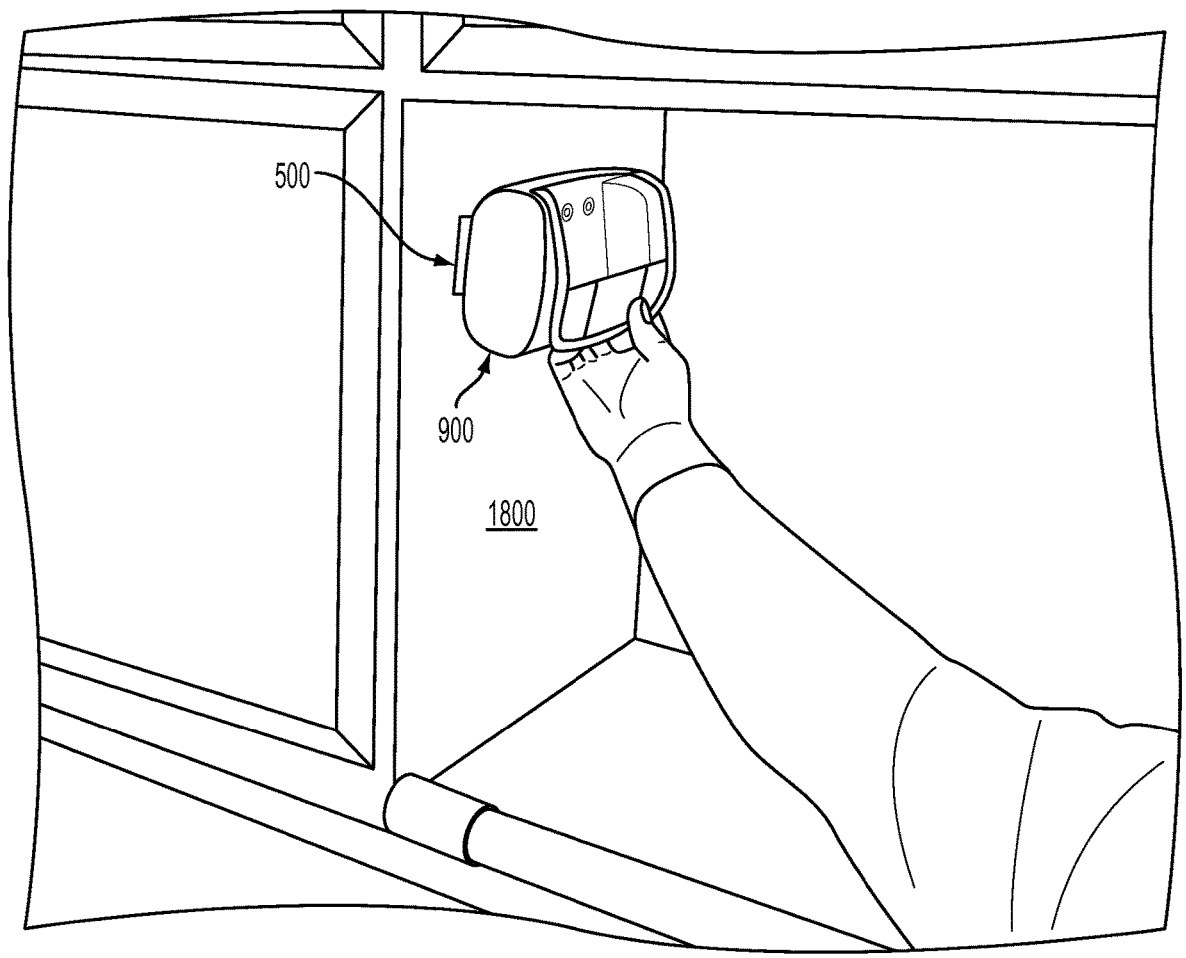
FIG. 18 illustrates an pouch mounted to a surface according to one or more embodiments shown and described herein.

In another example, the magnetic pouch mount 500 may be coupled to a wall 1800 under a cabinet as shown in FIG. 18. The pouch 900 may be held near to the magnetic pouch mount 500 and the magnetic attractive force would draw and removably couple the pouch 900 to the magnetic pouch mount 500 without the need for a user to visually align the catch 930 with the latch aperture 530 or actuate a locking mechanism to removably couple the pouch 900 to the magnetic pouch mount 500. The one or more alignment pegs 925 and the one or more mounting apertures 510 further aid in aligning the latch axis 550 and the catch axis 940 so that they are substantially parallel with each other. The substantial alignment of the latch axis 550 and the catch axis allow the latch tooth 535 to fully engage the catch 930 and provide a crash-ready coupling of the pouch 900 and the magnetic pouch mount 500.

The pouch may be coupled to a surface or device by removable means instead of the magnetic pouch mount 500 (FIG. 1) and mounting bracket 920 (FIG. 3) described above. Removable means may include, but is not limited to, screws, bolts, hook and loop fasteners, magnets, tape, latches, clasps, push-type plastic rivets, panel fasteners, twist lock fasteners, ball stud and ball receiver, tinnerman fastener, strap, twist-tie, suction cups, or any similar devices that mechanically joins or affixes two or more objects together and is easily separated.

For example, in another embodiment, the pouch may be secured to a surface or device with magnets coupled to the pouch. In this example, the surface or device may have magnets that are polar opposites of the magnets in the pouch or the surface or device may be made from a ferromagnetic material. As the pouch is moved into proximity of the surface or device, an attractive magnetic force draws the pouch to the surface or device and couples the pouch to the surface or device.

Referring to FIGS. 1-18, the container 906 and the flap 905 may be made from a fabric material to include nylon and carbon fiber, a rigid fabric material which is a fabric impregnated with a resin or a fabric with an increased thickness to reduce pliability, a plastic material, a rubber material, or the like. The pouch may be crash-ready. Referring now to FIGS. 1, 4, 9, and 12, a retrofit kit including the one or more magnetic pouch mounts 500 and the mounting bracket (i.e., as used throughout, the "mounting bracket" includes the mounting bracket 920 of FIG. 4, the first mounting bracket 920a and the second mounting bracket 920b of FIG. 9, and the modified mounting bracket 921) may be used to retrofit an pre-existing pouch to use the magnetic pouch attachment system. Fastening means 950 may be used to couple the mounting brackets to the pre-existing pouches. The mounting brackets may be modified to conform to the shape and size of the pre-existing pouch.

Figure 19:
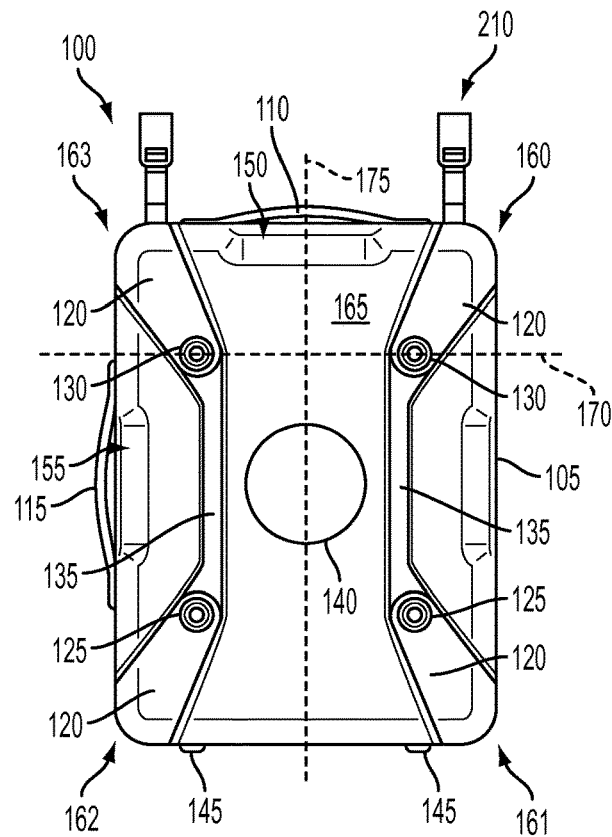
FIG. 19 a front view of a crash-ready, portable, item compartmentalization device (softwall) according to one or more embodiments shown and described herein.

Referring now to FIG. 19, a front view of a crash-ready, portable, item compartmentalization device (softwall 100) is shown. The softwall 100 may include a shell 300 (FIG. 3) comprising a first half shell 105 and a second half shell 205 (FIG. 2). The first half shell 105 may include a first handle 110, a second handle 115, one or more impact areas 120, one or more spacers 125, one or more mount locations 130, one or more reflective areas 135, indicia 140, and one or more feet 145. The first handle 110 may span a first handle area 150 and the second handle 115 may span a second handle area 155 (refer to FIG. 3). The first handle area 150 and the second handle area 155 may be depressions in the first half shell 105 and the second half shell 205 respectively that may allow a user to obtain a better grasp on either the first handle 110 or the second handle 115. The first handle 110 may be coupled to the first half shell 105 along a side substantially parallel to a central axis 175 and the second handle 115 may be coupled to the first half shell 105 along a side substantially parallel to a mount axis 170 and opposite from one or more feet 145.

Figure 31:
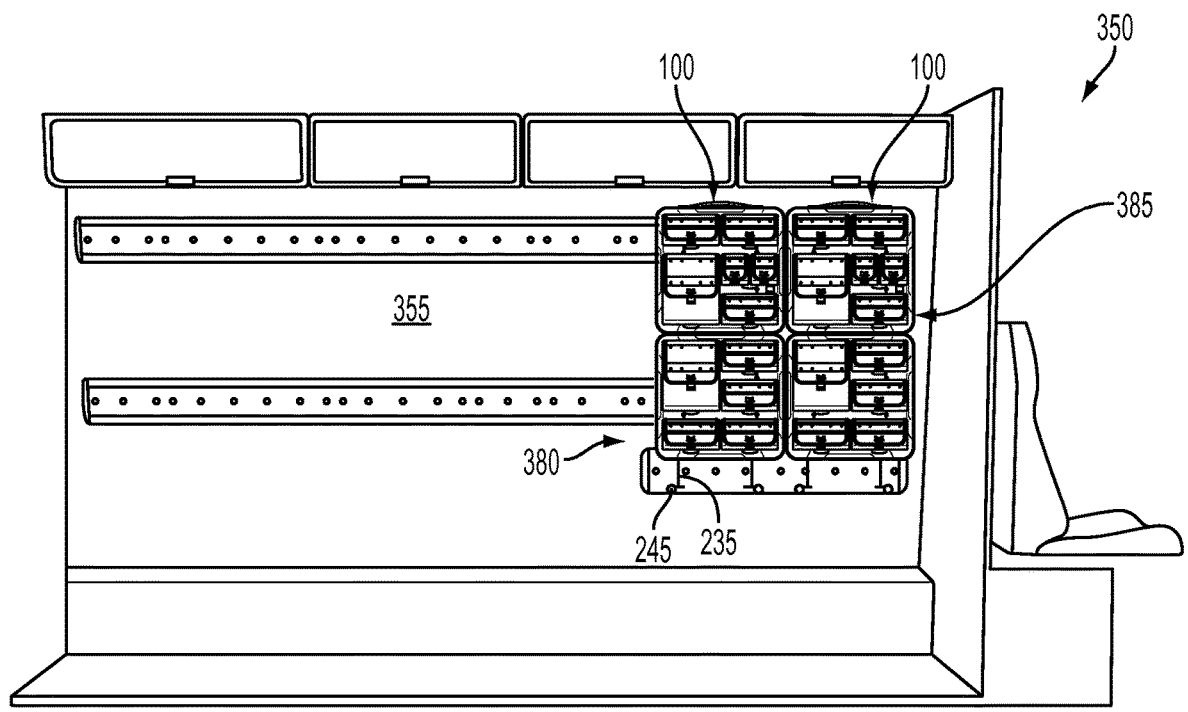
FIG. 31 is a cross-sectional view of a vehicle with the softwall coupled to a wall of the vehicle according to one or more embodiments shown and described herein.
Figure 33:
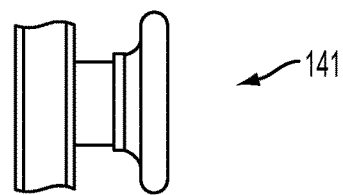
FIG. 33 is a side view of a mount stud according to one or more embodiments shown and described herein.
Figure 34:
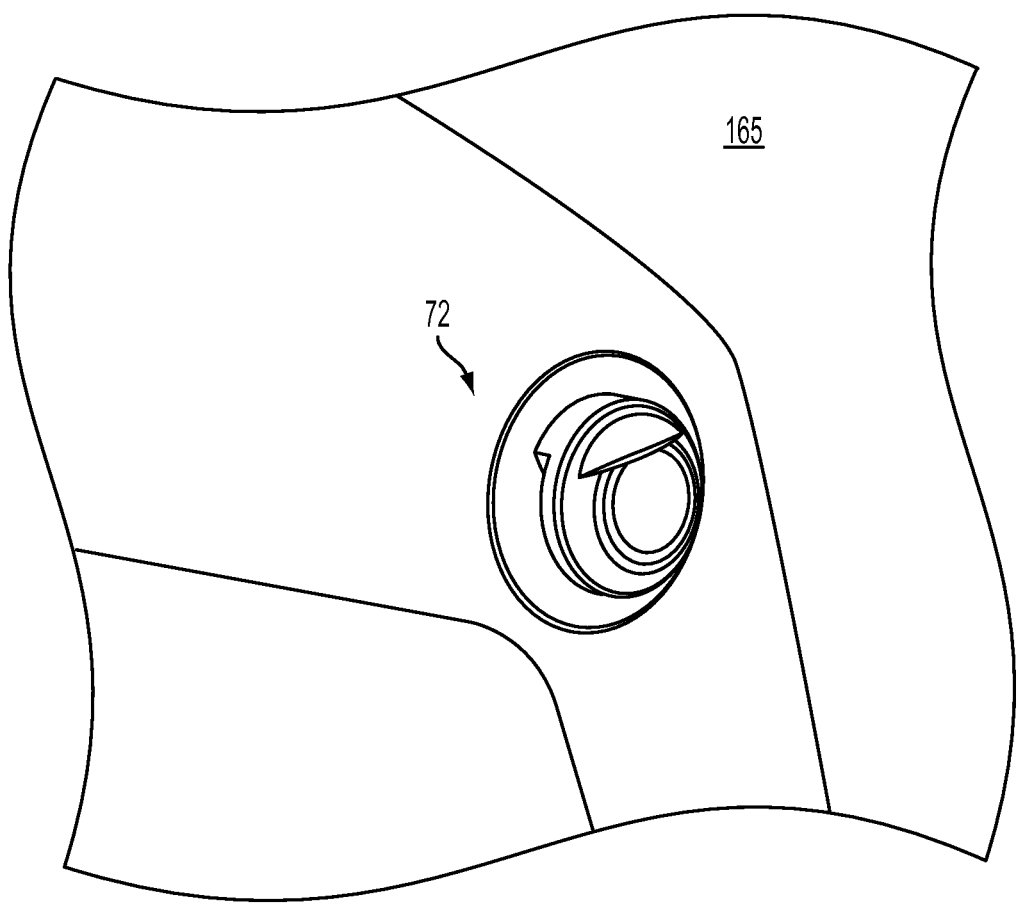
FIG. 34 is a isometric view of a wedge interface according to one or more embodiments shown and described herein.

The one or more mount locations 130 may be coupled to a first exterior surface 165 of the first half shell 105. The one or more mount locations 130 may be used to secure the softwall 100 to a surface (not shown) or structure (not shown). The one or more mount locations 130 may be a hook or other fastening means. In one embodiment, the one or more mount locations 130 may include a mount stud (FIG. 33). In one embodiment, the one or more mount locations 130 may be a wedge interface 72 shown in FIGS. 34 and 35. The coupling of the softwall 100 to a surface or structure is described in greater detail below in relation to an equipment mounting system 380 (FIG. 31).

Figure 20:
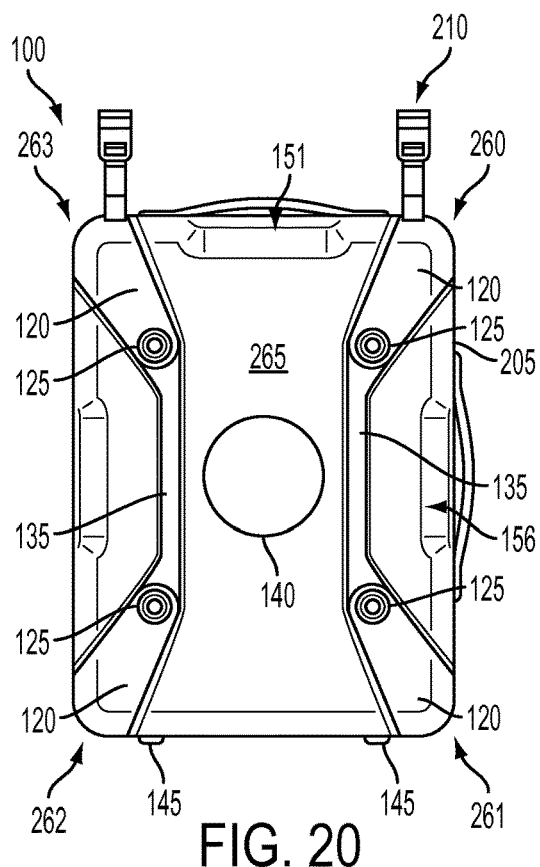
FIG. 20 is a rear view of the softwall according to one or more embodiments shown and described herein.

FIG. 20 is a rear view of the softwall 100 and depicts the second half shell 205. The second half shell 205 may include one or more impact areas 120, the one or more spacers 125, one or more reflective areas 135, one or more indicia 140, one or more restraint straps 210, and one or more feet 145. The one or more spacers may be coupled to the first half shell and the second half shell in the exterior space Referring to FIGS. 19 and 20, the one or more impact areas 120 may be made from rubber or the like. The one or more impact areas 120 are positioned at a plurality of corner areas 160, 161, 162, 163, 260, 261, 262, and 263. The one or more impact areas 120 may be used to absorb the force of an impact on the plurality of corner areas 160, 161, 162, 163, 260, 261, 262, and 263 of the softwall 100. The one or more spacers 125 may be made from rubber or the like.

Figure 24:
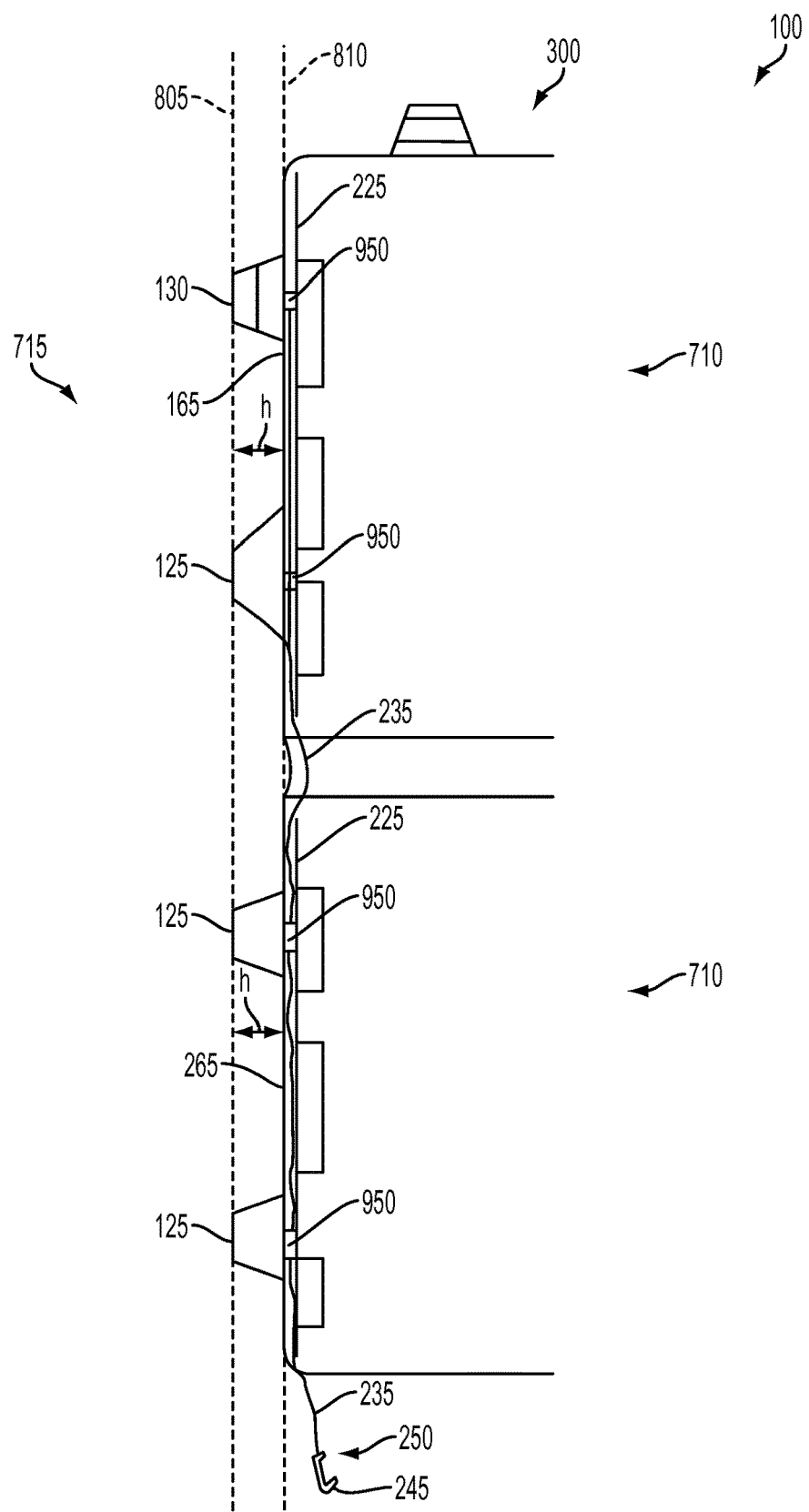
FIG. 24 is a cross-sectional view of the softwall 100 according to one or more embodiments shown and described herein.

Referring to FIG. 24, a surface axis 805 may define the outermost extent the one or more spacers 125. The surface axis 805 may be a distance h from an exterior axis 810. The surface axis 805 may correspond to a surface that the softwall 100 is resting against or coupled to. The exterior axis 810 may be defined as the substantial alignment of the planes created by the first exterior surface 165 and the second exterior surface 265. The one or more spacers 125 may be used to substantially align the exterior axis 810 with the surface axis 805 along parallel lines and maintain an alignment with the surface while the shell is in the open position. The surface may be a wall, a floor, ground, inclined surface, or the like. The distance h for each spacer of the one or more spacers 125 may be varied as needed to maintain the substantially parallel relationship between the exterior axis 810 and the surface axis 805. In one embodiment, the surface axis 805 may also define the outermost extent of the one or more mount locations 130. In another embodiment, the one or more mount locations 130 may be varied as needed to allow the softwall 100 to couple a surface or device and still maintain the substantially parallel relationship between the exterior axis 810 and the surface axis 805.

Referring back to FIGS. 19 and 20, the one or more reflective areas 135 may be arranged on the first exterior surface 165 of the first half shell 105 and the second exterior surface 265 of the second half shell 205 to provide identification or signally in all light level conditions. The one or more reflective areas 135 may be used to signal the presence of the softwall 100. In one embodiment, the one or more reflective areas 135 may be a light emitting diode (LED) or other luminary device that may be used to light the softwall 100 and the surrounding area. The first exterior surface 165 and the second exterior surface 265 may be color coded and/or may include one or more indicia 140 to indicate the contents of the softwall 100 or a designated use of the softwall 100. Either alone or in combination, the one or more reflective areas 135, the one or more indicia 140, color coding of the first exterior surface 165 and the second exterior surface 265, and the coloring of the one or more impact areas 120 may serve to indicate the designated use of the softwall 100 or the contents of the softwall 100. The contents and the designated use of the softwall 100 are explained in greater detail below.

Figure 21:
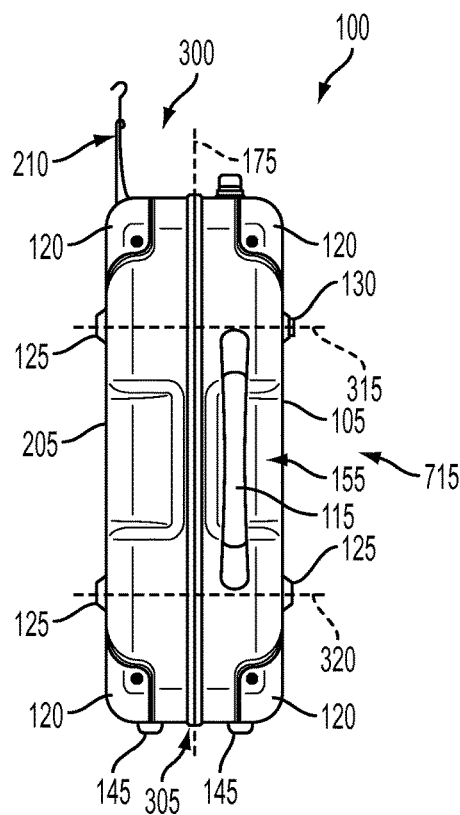
FIG. 21 is a side view of a shell of the softwall according to one or more embodiments shown and described herein.

FIG. 21 is a side view of the shell 300 of the softwall 100. The shell 300 may include the first half shell 105 and the second half shell 205. The shell 300 is shown in a closed position where the first half shell 105 and the second 205 are couple together such that the primary shell defines an interior space 710 (FIG. 7) and an exterior space 715 (FIG. 7). The first half shell 105 and the second half shell 205 may have substantially similar dimensions and may be hingedly coupled along a common side. In one embodiment, a hinge 305 may be constructed from cloth and may resemble a piano hinge. The hinge 305 may also be constructed from metal, plastic, rubber, or the like. The hinge 305 may be an example of a mechanism to hingedly couple the first half shell 105 and the second half shell 205 together along a common side to define the shell 300. Other examples of mechanisms to hingedly couple the first half shell 105 and the second half shell 205 together along a common side to define the shell 300 may include, but are not limited to, a butt hinge, a strap hinge, a t-hinge, and a double-acting hinge.

The first half shell 105 and the second half shell 205 may be constructed from a flexible material such as fabric, semi-rigid material such as a thick rubber or layered fibers mats, or rigid material such as polycarbonates.

Referring to FIG. 19, a mount axis 170 may be substantially orthogonal to a central axis 175 of the first half shell 105. The mount axis 170 may bisect each of the one or more mounting locations 130. Referring now to FIG. 21, the one or more mounting locations 130 and some of the one or more spacers 125 may lie along an upper spacer axis 315. The upper spacer axis 315 may also be substantially orthogonal to the central axis 175. Some of the one or more spacers 125 may lie along a lower spacer axis 320. The upper spacer axis 315 and the lower spacer axis 320 may be substantially parallel to each other. Referring to FIGS. 1 and 3, the upper spacer axis 315 and the mount axis 170 may define an upper plane and the lower spacer axis may lie along a lower plane where the upper plane and the lower plane are substantially parallel to each other.

Figure 22:
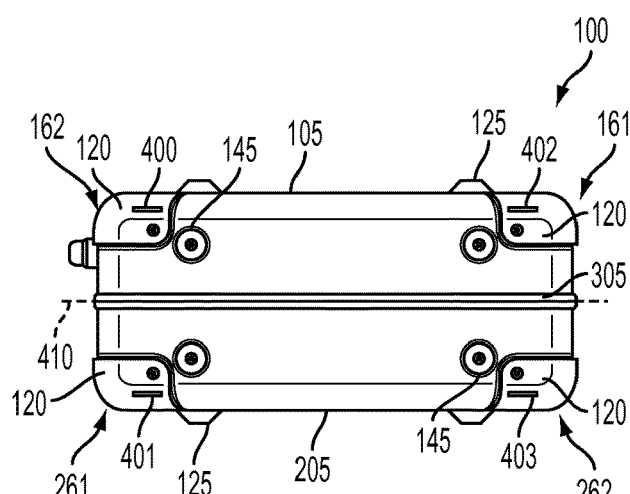
FIG. 22 is a bottom view of the softwall according to one or more embodiments shown and described herein.

FIG. 22 is a bottom view of the softwall 100. The hinge 305 may hingedly couple the first half shell 105 and the second half shell 205 substantially along a common side along a common axis 410. The one or more impact areas 120 are shown to wrap around the plurality of corner areas 161, 162, 261, and 262 respectively. A first strap slot 400, a second strap slot 401, a third strap slot 403, and a fourth strap slot 404 may be positioned at each of the plurality of corner areas 162, 262, 161, and 261 respectively. The first strap slot 400, the second strap slot 401, the third strap slot 403, and the fourth strap slot 404 are explained in greater detail below in the description for FIG. 24.

The first half shell 105 and the second half shell 205 of FIGS. 19 through 22 may also include one or more feet 145. The one or more feet 145 may be used to provide a contact points for the softwall 100 when the softwall 100 is placed on a surface. The one or more feet 145 may include characteristics to prevent the softwall 100 from sliding on the surface or the one or more feet 145 may include characteristics to prevent scratching of the softwall 100 and or the surface should the surface be non-planar in shape. The one or more feet 145 may also serve to protect the one or more impact areas 120 from the surface such that the one or more impact areas 120 are not resting directing on the surface when the softwall 100 is placed on the surface.

Figure 23:
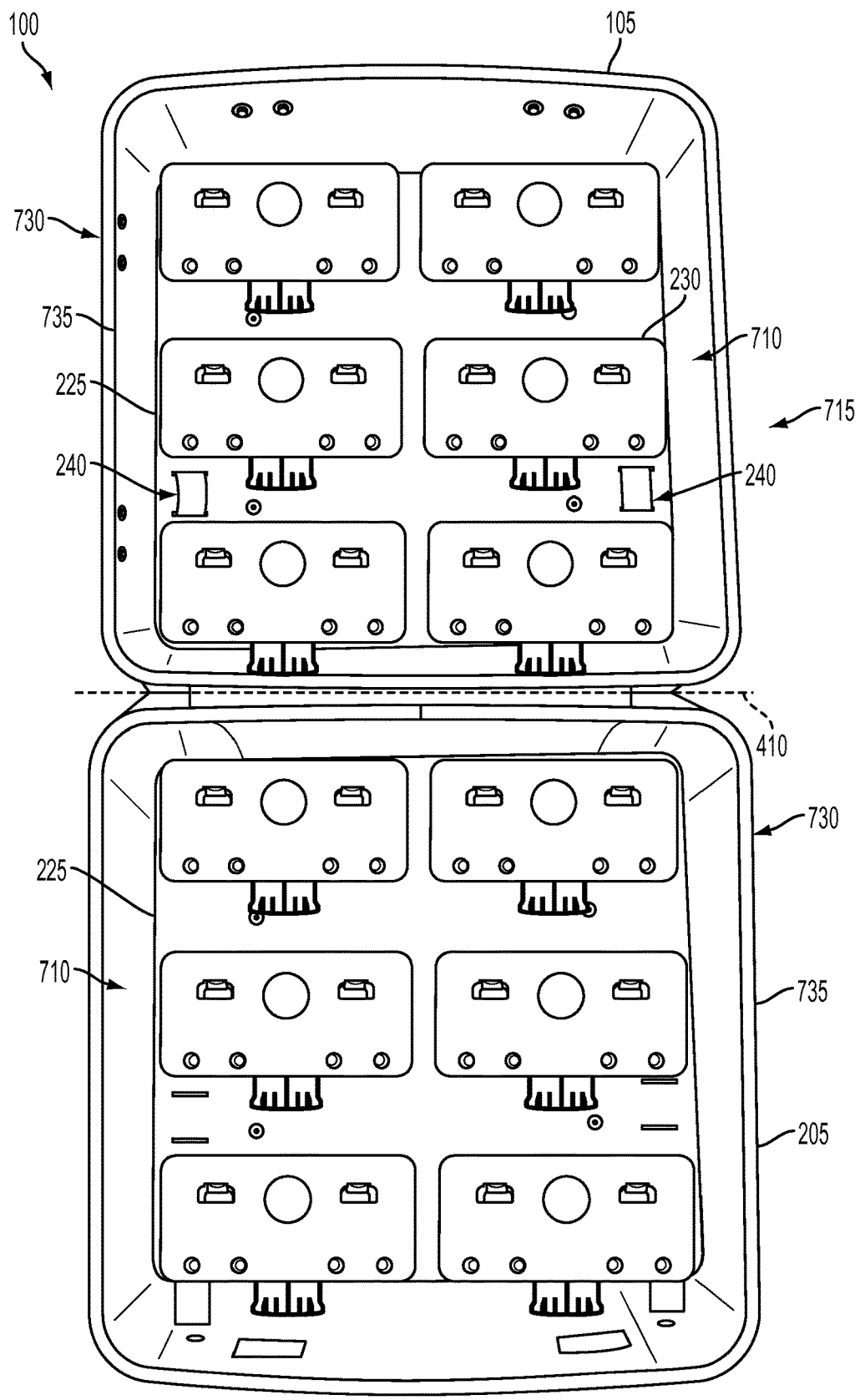
FIG. 23 is a top view of the softwall in an open position according to one or more embodiments shown and described herein.

FIG. 23 is a top view of the softwall 100 in an open position. The first half shell 105 is hingedly coupled to the second half shell 205 along the common axis 410. Within the interior space 710 of the first half shell 105 and the second half shell 205 may be one or more backing plates 225 and one or more removable means 230. Each backing plate 225 may be coupled to the first half shell 105 and the second half shell 205. Each removable means 230 may be coupled to the backing plate 225 such that the various embodiments of the pouch 900 may be coupled to and arranged within the interior space 710. In one embodiment, if the removable means 230 are magnets coupled to the various embodiments of the pouch 900, the backing plate 225 may be a ferrous metal to allow a magnetic attractive force be created between the various embodiments of the pouch 900 and the backing plate 225. In another embodiment, the removable means may be a button or clasp. In yet another embodiment, the removable means may be a thumb latch. As an alternative to the removable means 230, the combination of the magnetic pouch mount 500 (FIG. 1) and the mounting bracket 920 may be used.

A seam fastener 735 may be coupled to the outer edge 730 of the first half shell 105 and the second half shell 205. The seam fastener 735 may be unfastened to transition the softwall 100 to the open position and fastened to transition the softwall 100 to the closed position. The seam fastener 735 may include, but is not limited to, a zipper, a plurality of buttons, hook and loop fastener, a plurality of snaps, or the like. The same fastener is configured to secure the first half shell 105 to the second half shell 205 when the shell 300 (FIG. 21) is in the closed position.

Referring to FIGS. 23 and 25, the backing plate 225 may be coupled to one or more spacers 125 and the one or more mounting locations 130 through fastening means 950. One or more restraint straps 235 may be coupled to the first half shell 105 and the second half shell 205 and may be configured to secure the second half shell 205 and provide a tensioning force between the first half shell 105 and the second half shell 205 when the shell 300 is in an open position such that the interior spaced 710 remain vertically aligned. The one or more restraint straps 235 may be anchored to the fastening means 950 or at one or more anchor points 240. An anchor 245 may be coupled to an external end 250 of each restraint strap 235. When the one or more restraint straps 235 are pulled taunt, the tensioning force aligns the first half shell 105 and the second half shell 205 and may provide a contact force between the one or more spacers 125 and the surface or device the softwall 100 is coupled to. The anchor 245 may include, but is not limited to, a hook, a clasp, a latch, a grommet, and the like.

The interior compartment of the long pouch 903 is about twice as much volume as the single pouch 901 of FIG. 8. The dimensions of the long pouch 903 may be from about 3 in tall to about 7 in tall and from about 14 in wide to about 18 in wide.

Figure 28:
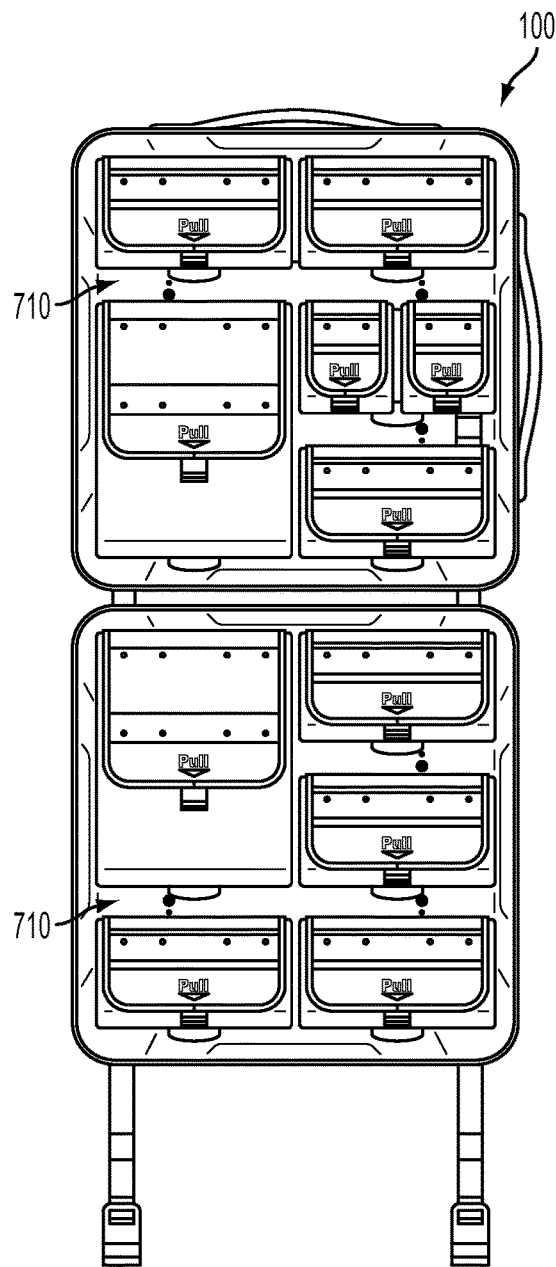
FIG. 28 is a front view of a second embodiment of the softwall according to one or more embodiments shown and described herein.
Figure 29:
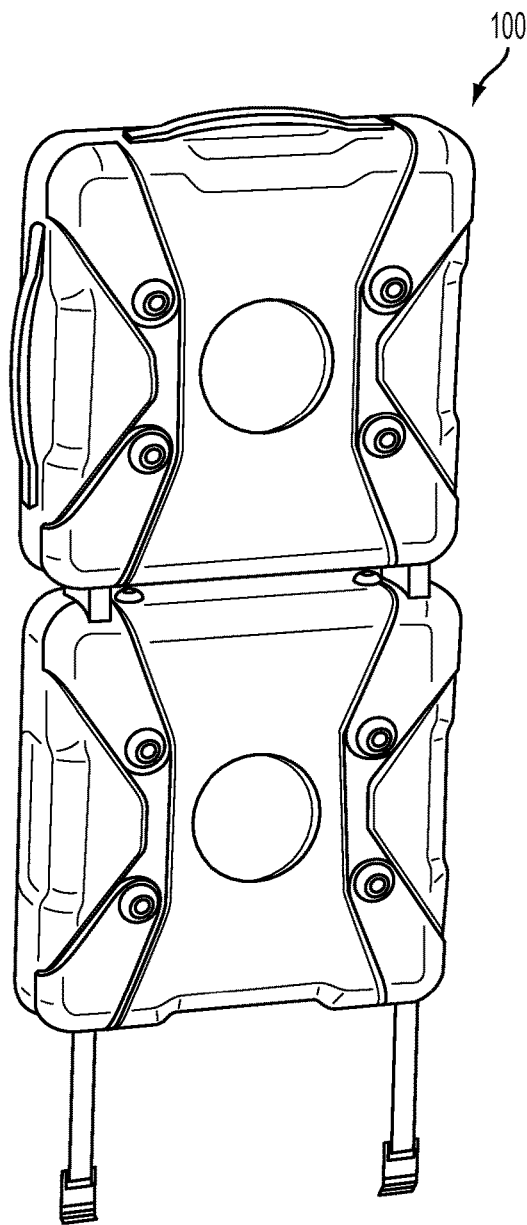
FIG. 29 is a rear view of the second embodiment the softwall according to one or more embodiments shown and described herein.

Referring now to FIGS. 25-29, various pouch configurations are shown in the interior space 710 of the softwall 100. FIGS. 25, 26, and 28 illustrate different arrangements of the various pouches within the interior space 710 of the softwall 100. FIGS. 26 and 27 illustrate a 4-row by 2-column grid of removable means 230 (FIG. 23). The dimensions of the 4-row by 2-column embodiment of the softwall 100 may be from about 23 in tall to about 25 in tall and from about 16 in wide to about 20 in wide in the closed position and from about 48 in tall to about 52 in tall in the open position. FIGS. 23, 28, and 29 illustrate a 3-row by 2 column grid of removable means 230. The dimensions of the 3-row by 2 column embodiment of the softwall 100 may be from about 16 in tall to about 20 in tall and from about 16 in wide to about 20 in wide in the closed position and from about 35 in tall to about 40 in tall in the open position. The shape of the shell 300 may be dictated by the arrangement of the removable means 230 in the interior space 710.

Figure 30:
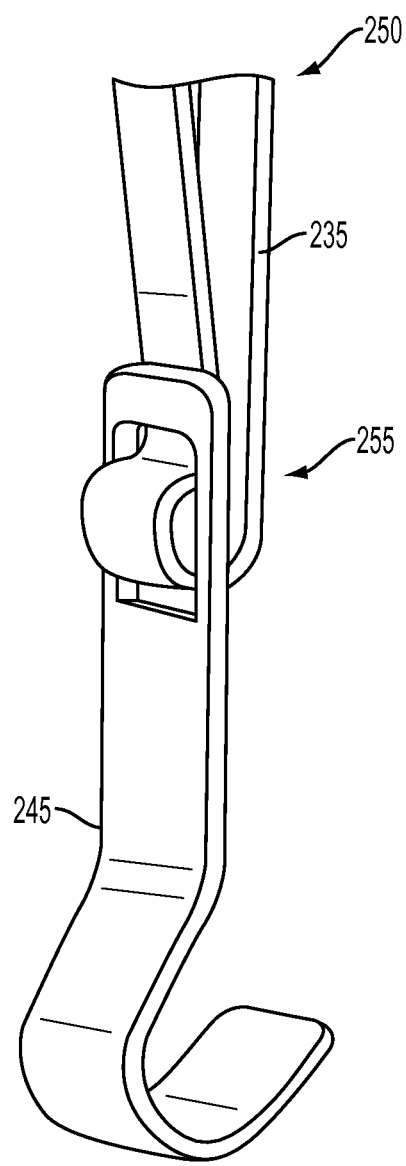
FIG. 30 is an isometric view of one embodiment of a restraint strap and an anchor according to one or more embodiments shown and described herein.

FIG. 30 is an isometric view of one embodiment of the restraint strap 235 and the anchor 245. The anchor 245 may include an adjustment means 255 to change the length of the external end 250 of the restraint strap 235. Adjustment means may include, but is not limited to, a tri-bar slide, a strap adjuster, a D-ring, a 2-sided halter ring, a 3-sided halter ring, a buckle, a post and grommet, and the like.

FIG. 31 is a cross-sectional view of a vehicle 350 with the softwall 100 removably coupled to the equipment mounting system 380 on a wall 355 of the vehicle 350. The softwall 100 allows a user to either hang the softwall 100 in the open position as shown in FIG. 31 or allows the user to remove the softwall 100, transition it the closed position, and carry it to another location. The removable means 230 of FIG. 23 allows the pouch to be removed and either moved to a different surface or device or swapped out with another pouch. In one example, a stock room may have a plurality of pouches already filled with supplies. When the user exhausts the supplies of one pouch, he can visit the stock room and swap out the pouch for a stocked pouch. The removable means allows the user to restock the softwall 100 without the need to assess a quantity of supplies within each pouch within the softwall 100. On a larger scale, the user may be able to swap out the whole softwall 100 for another stock softwall 100. The user may then couple the stocked softwall 100 to the wall 355 of the vehicle 350.

Figure 32:
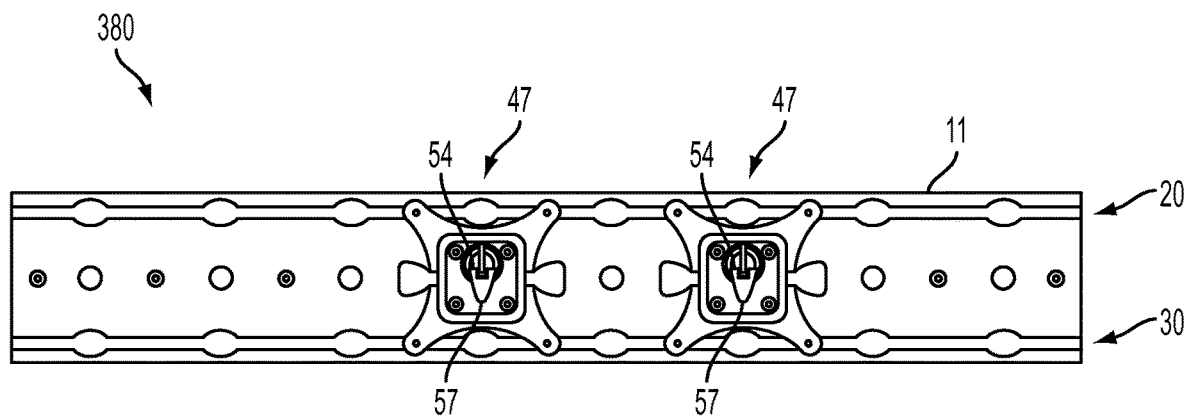
FIG. 32 illustrates an equipment mounting system according to one or more embodiments shown and described herein.

FIG. 32 is one embodiment of the equipment mounting system 380. The equipment mounting system 380 may include the quick mount track 11 and a wedge mount 47. The one or more mount locations 130 (FIG. 19) may be configured to removably couple with either the quick mount track 11 or the wedge mount 47. In one embodiment, the one or more mount locations 130 may be the mount stud 141 shown in FIG. 33. The mount stud 141 may be configured to slidably couple with a first outer slot 20 and/or a second outer slot 30 of the quick mount track 11. In another embodiment, the one or more mount locations 130 may be the wedge interface 72. The spacing between the one or more mount locations 130 on the first exterior surface 165 of the first half shell 105 may be defined by the spacing between two wedge mounts 47 as shown in FIG. 32. In other words, the distance between the one or more mount locations 130 along the mount axis 170 is substantially the same as the distance between a bowl aperture 54 on each wedge mount 47.

One or more restraint straps 235 and the anchor 245 may be removably coupled to the equipment mounting system 380 and may secure the lower end 385 of the softwall 100 and prevent it from being swinging feely within the vehicle 350.

Figure 35:
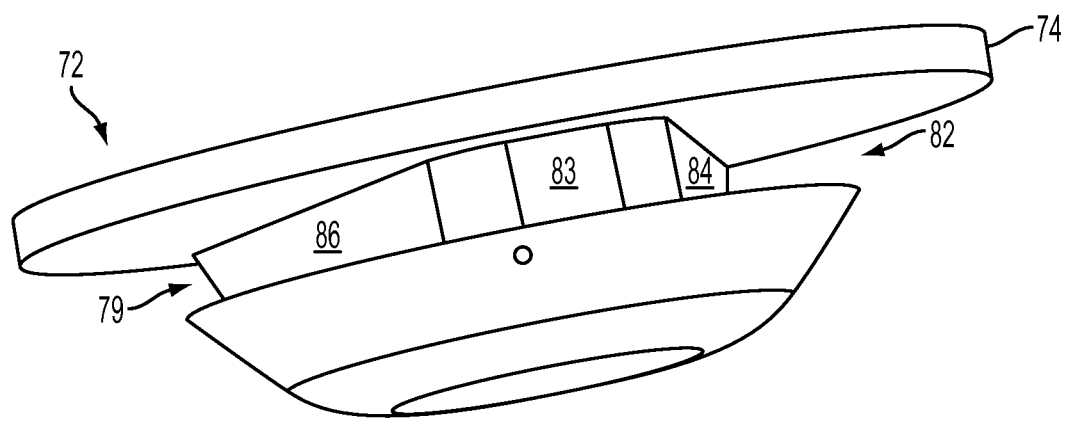
FIG. 35 is a front view of the wedge interface according to one or more embodiments shown and described herein.

FIG. 35 a front view of the wedge interface 72. A wedge 79 is situated between and couples a equipment plate 74 and a plurality of capture guides 78a and 78b together. The wedge 79 has a lead-in surface 83 which is configured to engage a keyhole slot aperture 57 on the wedge mount 47 and aid in rotational alignment of the wedge interface 72 and the wedge mount 47. In other words, the lead-in surface 83 is configured to rotationally align the wedge interface 72 and the wedge mount 47 by ensuring the lead-in surface 83 is the only part of the wedge interface 72 that may enter the keyhole slot aperture 57. The wedge 79 also includes a first incline surface 84 and a second incline surface 85. The first incline surface 84 and the second incline surface 85 are opposite each other and are coupled to the lead-in surface 83.

The softwall 100 may be used to quickly restock an emergency vehicle 350 between emergency calls. The softwall 100 may be removed from the equipment mounting system 380 within the emergency vehicle and taken to a room to be replenished. The vehicle 350 may be replenished with either another softwall 100 or the individual pouches (i.e., as used throughout, "pouches" may include the pouch 900 of FIG. 3, the single pouch 901 of FIG. 8, the tall pouch 902 of FIG. 11, and the long pouch 903 of 25) of the softwall 100 may be removed and replaced. In one embodiment, the one or more pouches within the softwall 100 may also be color coded to indicate their contents. The color coded pouches may aid in the replenishment of the softwall 100. The removable means may also be color coded to quickly assess which pouches were removed and need replacement.

The removal of the softwall 100 and/or the one or more pouches may allow ease of cleaning of the interior of the vehicle 350. The equipment mounting system 380 may enable the interior of the vehicle 350 to be reconfigurable. In other words, if a specific softwall 100 is needed on a specific side of the vehicle 350, a user may remove the specific softwall 100 from within the vehicle 350 and re-couple it to the equipment mounting system 380 in another location within the vehicle 350.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Certain terminology is used in the disclosure for convenience only and is not limiting. The words "left", "right", "front", "back", "upper", and "lower" designate directions in the drawings to which reference is made. The terminology includes the words noted above as well as derivatives thereof and words of similar import.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A vehicular crash-ready magnetic pouch assembly comprising:
   at least one mount comprising:
      an alignment plate comprising:
         a plurality of mounting points extending from a rear surface of the alignment plate; and
         at least one magnetic area defined within a front surface of the alignment plate along with at least one mounting aperture and at least one latch aperture; and
      a latch movable relative to the alignment plate between a retention position and a release position such that in the retention position, at least one latch tooth that forms a part of the latch protrudes into a corresponding one of the at least one latch aperture, while in the release position, the at least one latch tooth retracts away from the corresponding one of the at least one latch aperture;
   at least one pouch removably coupled to the at least one mount, the at least one pouch comprising:
      a container defining an interior compartment and having an opening for receiving items therein;
      a flap hingedly coupled to the container and sized to cover the opening and at least a portion of an outer surface of the container; and
      at least one mounting bracket configured such that a bracket magnetic area is defined within a surface thereof along with at least one alignment peg and at least one catch both of which project from the surface such that when the at least one mounting bracket is placed in proximity to the at least one mount, an attractive magnetic force is exerted between them, the at least one pouch and the at least one mount cooperative with one another in the retention position to maintain a connection between the at least one latch tooth and the catch that can withstand a gravitational force of at least 15 Gs in a fore-aft direction of the connection between the at least one latch tooth and the catch; and
   a compartmentalization device with at least one mount location disposed on an outer surface thereof, the compartmentalization device cooperative with the alignment plate and latch to secure the at least one pouch therein.

2. The magnetic pouch assembly of claim 1, wherein the flap further comprises a flexible window to allow viewing of the items in the interior compartment.

3. The magnetic pouch assembly of claim 1, wherein the container further comprises a flexible window to allow viewing of the items in the interior compartment.

4. The magnetic pouch assembly of claim 1, wherein the at least one pouch is selected from the group consisting of a single pouch configured to removably couple with half of the at least one mount, a single pouch configured to removably couple with a single one of the at least one mount, a long pouch configured to removably couple with two of the at least one mount positioned horizontally side-by-side and a tall pouch configured to removably couple with two of the at least one mount positioned vertically one above the other.

5. The magnetic pouch assembly of claim 4, wherein the at least one mount is an upper magnetic pouch mount positioned vertically above a lower magnetic pouch mount, and the tall pouch further comprises a latch adapter slidably coupled to the mounting bracket and configured to simultaneously actuate a first latch on the upper magnetic pouch mount and a second latch on the lower magnetic pouch mount to release the tall pouch from the upper magnetic pouch mount and the lower magnetic pouch mount simultaneously.

6. The magnetic pouch assembly of claim 1, wherein each of the at least one catch further comprises a rounded surface to aid in aligning with a respective one of the at least one latch aperture while each of the at least one alignment peg further comprises a rounded surface to aid in aligning with a respective one of the at least one mounting aperture.

7. The magnetic pouch assembly of claim 1, further comprising means for securing the flap to the outer surface of the container.

8. The magnetic pouch assembly of claim 1, wherein the compartmentalization device further comprises a shell with a first half shell and a second half shell.

9. The magnetic pouch assembly of claim 1, further comprising an equipment mounting system comprising a quick mount track and a wedge mount such that the at least one mount location of the compartmentalization device is removably coupled to at least one of the quick mount track and the wedge mount.

10. The magnetic pouch assembly of claim 1, wherein the at least one mounting aperture and at least one latch aperture that are defined within the front surface of the alignment plate are spaced apart from one another on the front surface.

11. The magnetic pouch assembly of claim 1, wherein the bracket magnetic area of the at least one mounting bracket comprises a ferromagnetic material.

12. The magnetic pouch assembly of claim 11, wherein the ferromagnetic material comprises a ferrous metal.

13. A method of utilizing a vehicular crash-ready pouch assembly, the method comprising:
   configuring at least one mount to comprise:
      an alignment plate comprising:
         a plurality of mounting points extending from a rear surface of the alignment plate; and
         at least one magnetic area defined within a front surface of the alignment plate along with at least one mounting aperture and at least one latch aperture; and
      a latch movable relative to the alignment plate between a retention position and a release position such that in the retention position, at least one latch tooth that forms a part of the latch protrudes into a corresponding one of the at least one latch aperture, while in the release position, the at least one latch tooth retracts away from the corresponding one of the at least one latch aperture;
   configuring a compartmentalization device with at least one mount location disposed on an outer surface thereof and configuring the compartmentalization device to be cooperative with the alignment plate and latch;

configuring at least one pouch to comprise
at least one mounting bracket configured such that a bracket magnetic area is defined within a surface thereof along with at least one alignment peg and at least one catch both of which project from the surface;
moving the at least one pouch into proximity of the at least one mount that is secured within the compartmentalization device; and
allowing an attractive magnetic force to be exerted between the at least one pouch and the at least one mount such that the at least one pouch aligns with and couples to the at least one mount, the at least one pouch and the at least one mount cooperative with one another in the retention position to maintain a connection between the at least one latch tooth and the catch that can withstand a gravitational force of at least 15 Gs in a fore-aft direction of the connection between the at least one latch tooth and the catch.

14. The method of claim 13, further comprising transitioning the latch from the retention position to the release position to remove the pouch from the at least one mount.

15. A vehicular crash-ready pouch retrofit kit, comprising:
a compartmentalization device defining an interior space with a backing plate secured therein;
at least one mount securable to the backing plate, the at least one mount comprising:
an alignment plate comprising:
a plurality of mounting points extending from a rear surface of the alignment plate; and
at least one magnetic area defined within a front surface of the alignment plate along with at least one mounting aperture and at least one latch aperture; and
a latch movable relative to the alignment plate between a retention position and a release position such that in the retention position, at least one latch tooth that forms a part of the latch protrudes into a corresponding one of the at least one latch aperture, while in the release position, the at least one latch tooth retracts away from the corresponding one of the at least one latch aperture; and
at least one mounting bracket configured to be coupled to a pre-existing pouch, the at least one mounting bracket comprising a bracket magnetic area defined within a surface thereof along with at least one alignment peg and at least one catch both of which project from the surface such that when the at least one mounting bracket is placed in proximity to the at least one mount, an attractive magnetic force is exerted between them, the at least one mounting bracket and the at least one mount cooperative with one another in the retention position to maintain a connection between the at least one latch tooth and the catch that can withstand a gravitational force of at least 15 Gs in a fore-aft direction of the connection between the at least one latch tooth and the catch.

16. The pouch retrofit kit of claim 15, wherein the catch further comprises a rounded surface to aid in aligning each catch with each latch aperture and transition each latch tooth from the retention position to the release position when each catch slidably couples with each latch aperture, and the one or more alignment pegs further comprises a rounded surface to aid in aligning each alignment peg with each mounting aperture.

* * * * *